United States Patent [19]
Clouse

[11] Patent Number: 4,914,587
[45] Date of Patent: * Apr. 3, 1990

[54] FINANCIAL DATA PROCESSING SYSTEM WITH DISTRIBUTED DATA INPUT DEVICES AND METHOD OF USE

[75] Inventor: Larry R. Clouse, Macurgie, Pa.

[73] Assignee: Chrysler First Information Technologies, Inc., Allentown, Pa.

[*] Notice: The portion of the term of this patent subsequent to Sep. 27, 2005 has been disclaimed.

[21] Appl. No.: 83,845

[22] Filed: Aug. 7, 1987

Related U.S. Application Data

[63] Continuation-in-part of Ser. No. 750,912, Jul. 1, 1985, Pat. No. 4,774,664.

[51] Int. Cl.⁴ .................................................. G06F 15/30
[52] U.S. Cl. ..................................... 364/408; 235/379
[58] Field of Search .................... 364/408, 200, 900; 235/379

[56] References Cited

U.S. PATENT DOCUMENTS

| | | | |
|---|---|---|---|
| 4,016,544 | 4/1977 | Morita et al. | 340/703 |
| 4,091,448 | 5/1978 | Clausing | 235/329 |
| 4,130,881 | 12/1978 | Haessler et al. | 364/900 |
| 4,141,001 | 2/1979 | Suzuki et al. | 340/711 |
| 4,186,438 | 1/1980 | Benson et al. | 364/200 |
| 4,310,838 | 1/1982 | Juso et al. | 340/703 |
| 4,317,957 | 3/1982 | Sendrow | 235/379 |
| 4,319,336 | 3/1982 | Anderson et al. | 364/200 |
| 4,321,672 | 3/1982 | Braun et al. | 235/379 |
| 4,346,442 | 8/1982 | Musmanno | 364/408 |
| 4,376,978 | 3/1983 | Musmanno | 364/408 |
| 4,404,649 | 9/1983 | Nunley et al. | 364/900 |
| 4,566,066 | 1/1986 | Towers | 364/408 |
| 4,597,046 | 6/1986 | Musmanno et al. | 364/408 |
| 4,613,946 | 9/1986 | Forman | 364/521 |
| 4,623,964 | 11/1986 | Getz et al. | 340/711 |
| 4,674,044 | 6/1987 | Kalmus et al. | 364/408 |

FOREIGN PATENT DOCUMENTS

| | | | |
|---|---|---|---|
| 0181438 | 5/1986 | European Pat. Off. | 364/401 |
| 1489572 | 10/1977 | United Kingdom | 364/408 |
| 1489573 | 10/1977 | United Kingdom | 364/408 |

OTHER PUBLICATIONS

Fritz Haussermann, "Universal Transaction Monitor UTM-the Transaction Processing Monitor of BS2000", pp. 77–82, May 1980.
Joachim Feldmann, "Siemens' Teleprocessing System—Transdata", pp. 112–118, Sep. 1978.
Ulrich Homborg, "TRANSDATA 970 Terminal System, Distributed Processing Through Terminals", pp. 119–123, Sep. 1978.

Primary Examiner—Jerry Smith
Assistant Examiner—Kim Thanh Tbui
Attorney, Agent, or Firm—Curtis, Morris & Safford

[57] ABSTRACT

A financial data processing system utilizing two levels of distributed processors interconnected to one another and a central processor interconnected to the first level of distributed processors and the method of operating the system, particularly with respect to the entry of data by way of the second level of distributed processors, are disclosed. The financial data being processed includes loan information representing the balance of each loan outstanding, the interest rate payable on each loan, the principal and interest due and payable for each periodic loan payment, the identity of each debtor, the delinquency, if any, on each loan, the collection histories of respective loans and financial information relating to leases and leased property. In one embodiment, the system provides for the high speed entry of data utilizing optical character readers which are utilized to scan customer statements containing pre-printed financial data in a format and type recognizable by the optical character reader. The system provides for plural terminals at both the first and second levels of distributed processors, including data entry devices such as keyboards and/or optical character readers, video display devices, such as cathode-ray tube display screens and memory storage devices such as floppy disk and hard disk drives.

20 Claims, 39 Drawing Sheets

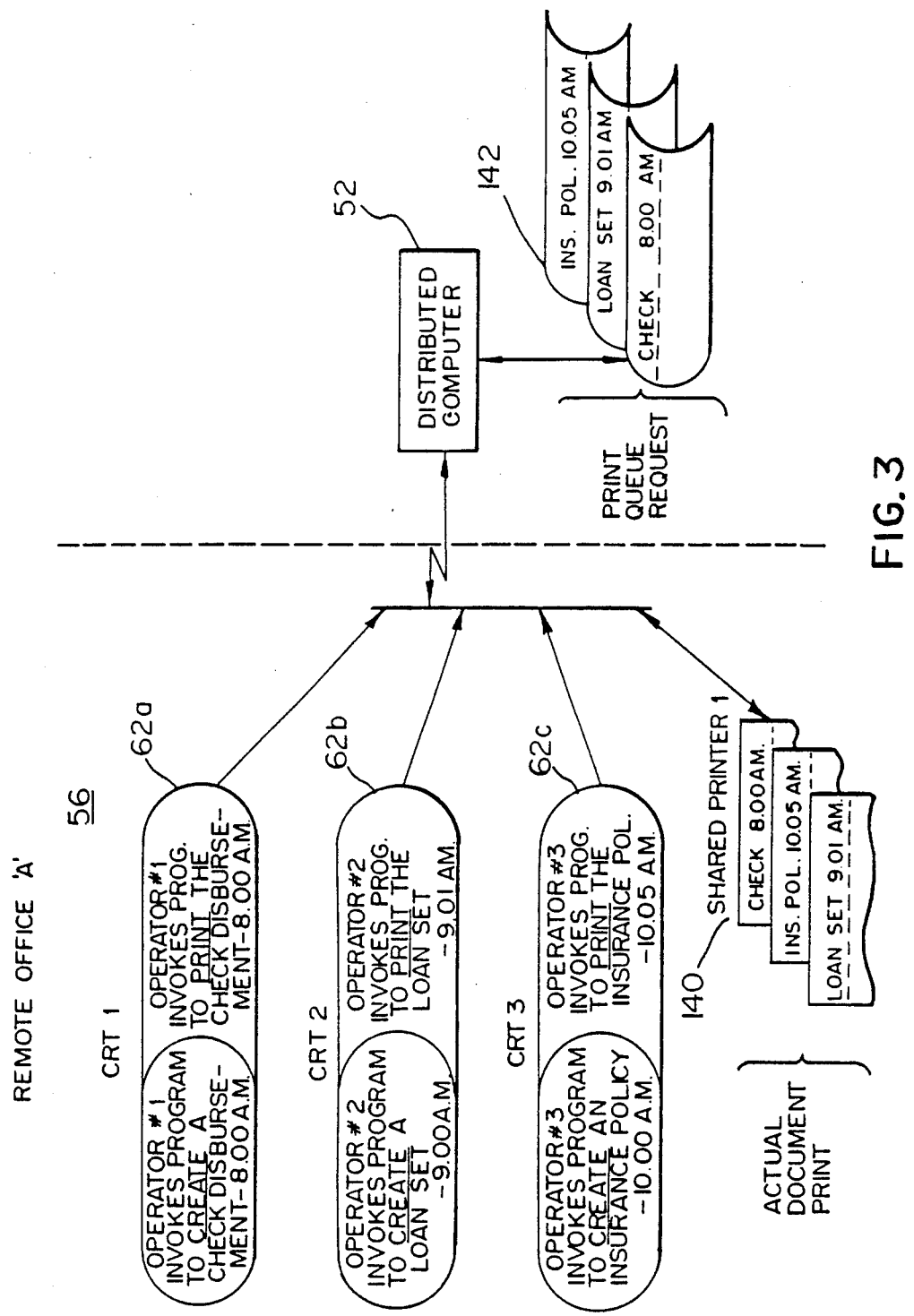

HOST MAIN MENU

USER-ID                    PASSWORD

ENTER OPTION

1 — GENERAL OFFICE INQUIRY
2 — MONTHLY SUMMARY INFORMATION
3 — CUSTOMER INQUIRY
4 — DISPLAY SELECTED DETAIL
5 — PRINT SELECTED STATISTICS
6 — DEALER INQUIRY
7 — BROKER INQUIRY
8 — STATE LEGAL INFORMATION INQUIRY
9 — MEMO RECEIVING
10 — MEMO SENDING
11 — MEMO FORWARDING
12 — SYSTEM USER MAINTENANCE
13 — SYSTEM NETWORK ADMINISTRATION

FIG. 5a

```
MMM0001                           MAIN MENU                OFFICE DATE:
                                                           SYSTEM DATE: 06-10-1985
                          USER -ID ==>     21M0001         PASSWORD ==>

ENTER OPTION ==>  4
   1 - DAILY OFFICE PROCEDURES                    11 - OFFICE INQUIRY
   2 - CUSTOMER APPLICATIONS                      12 - OFFICE FILE MAINTENANCE
   3 - CUSTOMER LOANS/ADVANCES/ADD-ONS            13 - DEALER INQUIRY
   4 - CUSTOMER PAYMENTS                          14 - DEALER FILE MAINTENANCE
   5 - CUSTOMER COLLECTIONS                       15 - BROKER INQUIRY
   6 - CUSTOMER SAVINGS                           16 - BROKER FILE MAINTENANCE
   7 - CUSTOMER INQUIRY                           17 - SYSTEM USER FILE MAINT.
   8 - CUSTOMER FILE MAINTENANCE                  18 - TEFRA FILE MAINTENANCE
   9 - RECEIPTS AND DISBURSEMENTS
  10 - FORMS PRINTING
           ENTER = CONTINUE                 ALT AND SYS REQ = EXIT

RESPONSE:
```

FIG. 7

```
MFP0000                                                      06-10-1985
01060007                    CUSTOMER PAYMENTS
 '  ENTER OPTION      ==>  1         EFFECTIVE DATE  ==>
 ** ENTER ACCT.NBR    ==>             OR LAST NAME   ==>
                                      1ST INITIAL    ==> ***  (MAX 10 CHARS)

*** NOTE: THE ABOVE APPLIES ONLY TO OPTIONS 3 THRU 13
  1 MULTIPLE MAIL                          9 DEFERMENT
  2 MULTIPLE MAIL (PERSONALINE CREDIT)    10 SPECIAL
  3 SINGLE                                11 INSURANCE
  4 PAYOFF                                12 ADD-ON
  5 CORRECTION                            13 ADD-ON PAYOFF
  6 VOID CORRECTION                       14 OTHER BRANCH
  7 REVERSAL (NSF)                        15 MULTIPLE MAIL (LEASING)
  8 VOID REVERSAL
         ENTER =CONTINUE        (PF1) =HELP          (PF4) =MAIN MENU
RESPONSE:  MFP 0165A USER HAS INQUIRY CAPABILITY ONLY ...UPDATE IGNORED
```

FIG. 8

```
MFP 0001                    CUSTOMER PAYMENTS                           06-10-1985
01060007                     MULTIPLE MAIL

ACCOUNT              PAYMENT
         NUMBER                AMOUNT                    RESPONSE

------------         ------------
       ------------         ------------
       ------------         ------------
       ------------         ------------
       ------------         ------------
       ------------         ------------
       ------------         ------------
       ------------         ------------
       ------------         ------------
       ------------         ------------
       ------------         ------------
       ------------         ------------

MAXIMUM OF 12 PAYMENTS MAY BE ENTERED
(ENTER) =CONTINUE        (PF1) =HELP        (PF3) =PRIOR SCREEN        (PF4) =MAIN MENU
RESPONSE:
```

FIG. 9

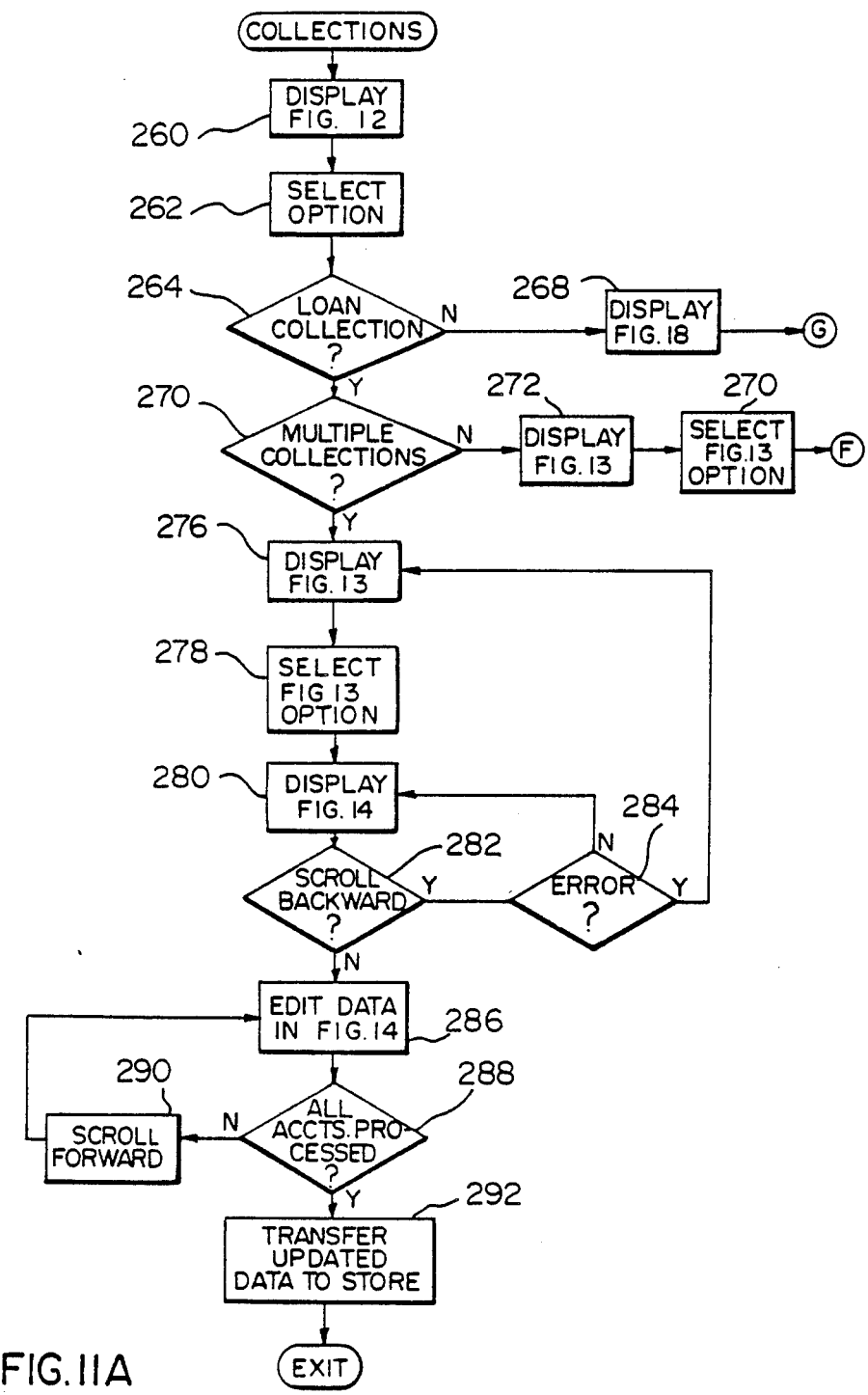
FIG.IIA

```
MCL1000                     COLLECTION/FOLLOW-UP SUB MENU
01050057
                                    ENTER OPTION    ==>
                                    ACCOUNT NUMBER  ==>
                                    LAST NAME       ==>
                                    FIRST INITIAL   ==>

1 - MULTIPLE COLLECTIONS
   2 - COLLECTION FUNCTION
       (ACCOUNT NUMBER OR LAST NAME & FIRST INITIAL OPTIONAL)
   3 - LEASE COLLECTION FOLLOW-UP
       (ACCOUNT NUMBER OR LAST NAME & FIRST INITIAL OPTIONAL)
   4 - LEASE INSURANCE/TITLE FOLLOW-UP
       (ACCOUNT NUMBER OR LAST NAME & FIRST INITIAL OPTIONAL)

ENTER = CONTINUE          (PF1) = HELP          (PF4) = MAIN MENU
RESPONSE:
```

FIG. 12

MCL3000
01050057

COLLECTION CATEGORY SELECTION

ENTER OPTION ==>
ENTER OPTIONAL PAGE NUMBER ==> 001

1   1 THRU   5 DAYS      08 PAGES AVAILABLE
2   6 THRU  10 DAYS      17 PAGES AVAILABLE
3  11 THRU  15 DAYS      08 PAGES AVAILABLE
4  16 THRU  29 DAYS      07 PAGES AVAILABLE
5  30 THRU  59 DAYS      02 PAGES AVAILABLE
6  60 THRU  89 DAYS      02 PAGES AVAILABLE
7  90 THRU 119 DAYS      02 PAGES AVAILABLE
8 120 THRU 149 DAYS      00 PAGES AVAILABLE
9 POTENTIAL CHARGE OFFS  03 PAGES AVAILABLE
10 REPOS/FORECLOSURES    01 PAGES AVAILABLE
11 LEGALS                01 PAGES AVAILABLE
12 JUDGEMENTS            02 PAGES AVAILABLE
13 BANKRUPTS             01 PAGES AVAILABLE
14 CHARGE OFFS           04 PAGES AVAILABLE
15 STATUS ON ALL ACCOUNTS (PF3) = PRIOR SCREEN    (PF4) = MAIN MENU

ENTER = CONTINUE
RESPONSE:

FIG. 13

```
MCL4200                              MULTIPLE COLLECTIONS                        06-11-1985
01050057                                                                         PAGE 001
SEQ.                                                                             SECURITY SOL
 DD   PAYMENT           NAME            RES. NBR.     POE NBR.                NA ACCT. NBR.
 DATE COL.ID  *WHERE   BALANCE  DLP   TOTAL  DUE ACTION  HOLD PPA SP  REMARKS
           *ACTION SOLUTION HOLD DATE
1 WILLIAM              H JOHNSON       213-427-6484   000-000-0000            RFC
   10    724.65    82,610.10 08 06    724.65 PMP    6 1 2/IM                  C55158892
 6 13 UD
2 PAUL                 K FLANAGAN      001-653-6332   001-674-6967            RFC
   06    581.26    80,795.14 08 13    581.26 PMP    6 1 2/IM                  C55166986
 6 13 UD
3 DAVID                M SEE           001-995-8340   213-427-5414            RFC
   07    529.49    61,420.84 08 16    529.49 PMP    6 1 2/IM                  C55174154
 6 13 UD
4 CLIFFORD             E KIRST         818-244-4200   000-000-0000            RFC
   07    344.18    19,274.08 08 02    344.18 PMP    6 1 2/IM                  C55176498
 6 13 UD
5 ELIAS                D QUINTANA      714-968-8577   714-891-4911            RFC
   08    789.08    93,111.44 08 10    789.08 PMP    6 1 2/IM                  C55214125
 6 13 UD
   (PF7) = SCROLL BACKWARD      (PF8) = SCROLL FORWARD    (PF1) = HELP
           ENTER = CONTINUE             (PF3) = PRIOR SCREEN  (PF4) = MAIN MENU
TER OPTION ==>
RESPONSE:
```

FIG. 14

```
MCL4000                                                              06-11-1985
01050057                    COLLECTION CUSTOMER SELECTION              PAGE  01

STATUS = 1 THRU 5 DAYS

NAME          BALANCE    BEST CONTACT   CALL DATE   HOLD DATE   COL.ID
01  01  W JOHNSON       82610.10                     05 15      06  01      UD
01  02  P FLANAGAN      80795.14                     05 15      06  01      UD
01  03  D SEE           61420.84                     05 15      06  01      UD
01  04  C KIRST         19274.08                     05 15      06  01      UD
01  05  E QUINTANA      93111.44                     05 30      06  01      UD
01  06  W SCOTT         60660.00                     05 30      06  01      UD
01  07  M BATRA          2659.25                     05 30      06  02      UD
01  08  R NORRIS        48597.92                     05 30      06  02      UD
01  09  A WUOLLET       39469.00                     05 29      06  02      UD
01  10  H ROBINSON      47278.41                     05 20      06  03      UD
01  11  M MERWIN         1468.08   ANY TIME          06 03      06  05      UD
01  12  F MURRIETA      25995.43                     05 29      06  05      UD
01  13  R GOODMAN       25013.59                     06 03      06  05      UD
01  14  L DRINNON        2595.88   ANY TIME          05 30      06  05      UD
01  15  R ALKINS         2331.29   ANY TIME          05 30      06  05      UD (PF7) = SCROLL BACKWARD       (PF8) = SCROLL FORWARD      (PF4) = MAIN MENU
ENTER OPTION ==>       ENTER = CONTINUE      (PF3) = PRIOR SCREEN
RESPONSE:
```

FIG. 15

```
MCL4005                         COLLECTION CONTACT                          06-11-1985
CLASS ACCOUNT NUMBER ==> 519181     RECOURSE PLAN  N   STOP PAYMENT
. ACCOUNT NO.     DUE DATE   PRODUCT LINE       NOTE DATE        *DEALER NO.
  C55142326          07      REC VEHICLES       12 08 83         082 M55001469
NAME AND ADDRESS                    CO-BORROWER NAME, EMPLOYER, BUS.PHONE
RICHARD    T NORRIS                 MARY       NORRIS
1303 S GERTRUDA AVE                 SELF
REDONDO BEACH      CA    90277      213 540 8246 EXT  0000
EMPLOYER:    20TH CENTURY FOX       PAY DAY
SPECIAL INFO:
BUSINESS PHONE 213 203 2308 EXT 0000   CONDITION
HOME PHONE     213 540 8246 EXT 0000       CONFIDENTIAL
NEARBY PHONE   000 000 0000 PROMISES BROKEN    SOLICITABLE             41,117.66
BEST CONTACT                NO. OF NSF'S       INS. CODE                     MNN
PLACE                       NO. OF TIMES 30    ADD-ON DATE     (PD)
TOTAL NOTE     52,069.20    NO. OF TIMES 60    INS. EXPIRE     (PD)
BALANCE        48,597.92    NO. OF TIMES 90    LAST STATEMENT   09 22 84
ADD-ON AMT.                 SECURITY      RFC  STATEMENT BAL.         48,597.92
REG. PAYMENT      433.91    TERM          120  LAST DEFERMENT
ONE LATE FEE                REMAINING TERM 112 MONTHS DEFERRED
TOTAL DUE         433.91    OTHER ACCOUNTS     APR                        14.9986

ENTER = CONTINUE  (PF1) = HELP   (PF5) =  NO ANSWER  (PA2)  =  CANCEL
RESPONSE:
```

FIG.16

```
MCL4010                                                                              06-11-1985
01050057
                              COLLECTION COMMENT
                       STATUS =   1 THRU 5 DAYS
RICHARD      BORROWER               MARY                                    CO-BORROWER
             T NORRIS                                                         NORRIS
PAST DUE AMOUNT              433.91  AVG. DAILY INT.
PRINCIPAL SHORTAGE           433.91  REG. PAYMENT                             433.91
ADD-ON DUE                           ADD-ON PAYMENT
INTEREST DUE                         INTEREST CALC. TO  9 11 1984
LATE FEES DUE                        REPOSSESSION DATE
AMOUNT PAID   INTEREST LATE FEES  PRINCIPAL  NEW BALANCE  DATE PAID PCODE CHGS TO
    433.91                          433.91   49,465.74    6-12 84    PY    9
    433.91                          433.91   49,031.83    7 10 84    PY    9
    433.91                          433.91   48,597.92    8  7 84    PY    9
TYPE/DATE LETTER                     STOP PAYMENT    (Y=YES) MONTH PAID THRU    08
SPECIAL ACTIVITY =
DATE COL.ID *WHERE *ACTION SOLUTION HOLD DATE    REMARKS
5 15  UD    TR      PMP     2/IM    5 10 1985
5 30  UD    TR      PMP     2/IM    6  1 1985
5 30  UD    TR      PMP     2/IM    6  2 1985
6 13  UD

ENTER   = CONTINUE  (PF1) = HELP  (PF3) = PRIOR SCREEN  (PA2) = CANCEL
RESPONSE
```

FIG.17

```
MCL4001                         LEASE INSURANCE/TITLE FOLLOW-UP              07-23-1985
                                                                             PAGE 01
                          STATUS = INSURANCE EXPIRED
                          CATEGORY

NAME          DELQ/INS/TITLE  ACCT NBR    BEST CONTACT  CALL DATE  HOLD DATE  COL-ID
01 JOHN W GOR  009        *         L55116314                    00 00     00 00
02 ROBERT L S  014        *         L55176771                    00 00     00 00
03 CALIF STUF  014        *         L5517650                     00 00     00 00
04 MONTERY DO  004        *         L55117783                    00 00     00 00
05 L C O A LA  009        *         L55176136                    00 00     00 00
.06 SINGING HI 004        *         L55176417                    00 00     00 00
07 SAN DIEGO   000        *         L55176730                    00 00     00 00
08 ERROL FINE  004        *         L55120563                    00 00     00 00
09 HUAN-HSIUN  009        *         L55122882                    00 00     00 00
10 LINDA R CA  009        *         L55123310                    00 00     00 00
11 IRA A KRAU  004        *         L55123393                    00 00     00 00
12 CAROLYN RU  014        *         L55124144                    00 00     00 00
13 JOSEPH L S  004        *         L55124797                    00 00     00 00
14 LOUIS A ZI  004        *         L55125364                    00 00     00 00
15 GARY B WIM  004        *         L55127014                    00 00     00 00

(PF7)   =  SCROLL BACKWARD         (PF8)  =  SCROLL FORWARD
ENTER OPTION ==>     ENTER  =  CONTINUE       (PF3)  =  PRIOR SCREEN
RESPONSE
```

FIG. 18

```
MCL4006                      LEASE COLLECTION/FOLLOW-UP CONTACT
   OLD LEASE NUMBER  ==>  008149                            STATUS
   LEASE NO: L55116314  PRODUCT LINE OPEN CONSUMER          DEALER NO M76015894
   NAME AND ADDRESS
J                    JOHN W GORDON
PO BOX 683
WALNUT                    CA   917890000
EMPLOYER:
SPECIAL INFO:                                        NO ANSWERS
BUSINESS PHONE  714 598 2828 EXT 0000     CONDITION           LAST STMT   2 14 1985
HOME PHONE      714 877 2600 *CONTACT DAY/TIME
   *PASTDUE*            *SCHEDULED*                   DDC:
BASE PMT:           531.01   LEASE DATE    11 20 1983            11 - 29 DAYS
TAX .065000         34.52    TERM                48               30 - 59 DAYS
TOTAL PMT:          565.53   MONTHS REMAINING    30               60 - 89 DAYS
OTHER CHG(S)                 VEHICLE 00                           90+     DAYS
UNPAID LATE CHG              INITIAL VALUE  26,952.00
                             RESIDUAL       11,655.84         *INS:              *
TOTAL DUE           565.53   BASE PMT          531.01         TITLE:
                             TAX .065000        34.52
DUE FOR: 5 20 1985           TOTAL PAYMENT     565.53

ENTER    = CONTINUE     (PF1) = HELP    (PF5) = NO ANSWER   (PA2)  = CANCEL
RESPONSE: MCL 0113A MODEL CODE NOT FOUND ON RMMT FILE
```

FIG.19

```
MCL4011                    LEASE COLLECTION/FOLLOW-UP COMMENT                              07-23-1985
LEASE NO: L55116314        PRODUCT LINE     OPEN CONSUMER      DEALER NO M76015894
NAME      JOHN W GORDON
J   *** PASTDUE ***        *** SCHEDULED ***                STATUS
BASE PMT:        531.01    LEASE DATE     11 20 1983                    DDC:
TAX .065000       34.52    TERM                    48                   11 - 29 DAYS
TOTAL PMT:       565.53    MONTHS REMAINING        30                   30 - 59 DAYS  1
OTHER CHG(S)               VEHICLE                                      60 - 89 DAYS
UNPAID LATE CHG            INITIAL VALUE    26,952.00                   90+    DAYS
                           RESIDUAL         11,655.84
TOTAL DUE        565.53    BASE PMT            531.01                   INS:          *
                           TAX .065000          34.52                   TITLE:
DUE FOR:    5 20 1985      TOTAL PAYMENT       565.53

SPECIAL ACTIVITY =
DATE COL.ID *WHERE *ACTION SOLUTION HOLD DATE          COMMENTS 6 13   UD

ENTER = CONTINUE      (PF1) = HELP        (PF3) = PRIOR SCREEN        (PA2) = CANCEL
RESPONSE:
```

FIG. 20

| PERSONAL COMPUTER | CUSTOMER PAYMENTS<br>MULTIPLE MAIL | PERSONAL COMPUTER |
|---|---|---|

THIS APPLICATION USES THE 3270/PERSONAL COMPUTER TO ASSIST WITH THE PROCESSING OF THE MULTIPLE MAIL CUSTOMER PAYMENTS APPLICATION.

PLEASE PRESS THE APPROPRIATE PF KEY:

(PF1) PAYMENT PROCESSING HELP (PF2) PAYMENT ENTRY ONLY \*\*\*8100 INACTIVE\*\*\*

(PF3) BEGIN PAYMENT PROCESSING (PF4) END PAYMENT PROCESSING

FIG. 23A

PERSONAL COMPUTER MULTIPLE PAYMENTS

WHEN (PF2) IS SELECTED, YOU MAY INPUT PAYMENTS EVEN WHEN THE 8100
IS DOWN FOR REPAIRS. WHEN AVAILABLE YOU MUST SELECT (PF3) TO
START THE 8100 PROCESSING.

IF THE SYSTEM DOES NOT DETECT A PROBLEM WITH THE PRIOR PAYMENT
PROCESSING SESSION, THEN THE MULTIPLE PAYMENT INPUT SCREEN WILL
BE DISPLAYED FOR YOU TO START INPUTTING PAYMENTS.

A RESTART SCREEN WILL BE DISPLAYED IF THE SYSTEM DETECTS THAT
PAYMENT PROCESSING WAS NOT COMPLETED OR A PROBLEM OCCURRED FROM
THE PRIOR SESSION. YOU WILL HAVE THE OPTION OF NORMAL PROCESSING
OR RESTART PROCESSING.

IF NORMAL PROCESSING IS SELECTED THE MULTIPLE PAYMENT MAIN MENU
WILL BE DISPLAYED FOR YOU TO START PAYMENT PROCESSING. FILES WILL
BE REFRESHED.

IF RESTART PROCESSING IS SELECTED, THE SYSTEM MAY REQUEST THAT YOU
VERIFY ACCOUNTS SUBMITTED AND SUCCESSFULLY PROCESSED. IF THERE
IS A NEED TO VERIFY, THE SYSTEM WILL PRESENT THESE ACCOUNTS TO YOU.
IF VERIFICATION IS NOT NEEDED THE MULTIPLE PAYMENT INPUT SCREEN
WILL BE DISPLAYED FOR PAYMENT INPUT.

THE TRANSACTION JOURNAL IS USED TO VERIFY ACCOUNTS WERE PROCESSED
SUCCESSFULLY.

PF1 = ADDITIONAL HELP     ENTER = EXIT
                PERSONAL COMPUTER MULTIPLE PAYMENTS

WHEN (PF3) IS SELECTED, VARIOUS SCREENS MAY BE DISPLAYED DEPENDING
ON THE STATUS OF THE SYSTEM WHEN PAYMENTS WERE LAST PROCESSED.

WHEN (PF4) IS SELECTED, YOU WILL EXIT PERSONAL COMPUTER MULTIPLE
PAYMENTS. AT THIS TIME THE C> SHOULD BE DISPLAYED ON YOUR PERSONAL
COMPUTER SCREEN. PRESS THE JUMP KEY TO DISPLAY THE 8100 MULTIPLE
PAYMENT SCREEN AND FOLLOW NORMAL LOGOFF PROCEDURES TO EXIT.
(CAPSLOCK MUST BE OFF TO JUMP TO 8100)

ENTER = EXIT

FIG.23B

MFP0001　　　　PERSONAL　　　　CUSTOMER PAYMENTS　　　PERSONAL
　　　　　　　　COMPUTER　　　　 MULTIPLE MAIL　　　　　COMPUTER

ACCOUNT　　　　PAYMENT
NUMBER　　　　 AMOUNT　　　　　　　　　　　　　　　　RESPONSE

MAXIMUM OF 12 PAYMENTS MAY BE ENTERED
   (PF1) = HELP    (PF3) = PROCESS PAYMENTS ENTERED
   (PF4) = GO TO MAIN MENU    (PF5) = NO MORE PAYMENTS TO ENTER
   (PF6) = VIEW/CORRECT PAYMENTS IN ERROR
response:
         CAPSLOCK KEY OFF        NUMLK KEY OFF

FIG. 24A

PERSONAL COMPUTER MULTIPLE PAYMENTS HELP
(PF3) PROCESS PAYMENTS ENTERED:
    THIS KEY IS PRESSED WHEN PAYMENTS ENTERED ARE READY TO BE
    SUBMITTED FOR PROCESSING.
(PF4) GO TO MAIN MENU:
    THIS KEY IS PRESSED WHEN YOU WISH TO EXIT THE PAYMENT INPUT
    SCREEN AND RETURN TO MAIN MENU.  ALL INPUT INFORMATION ON
    THE SCREEN IS ERASED.
(PF5) NO MORE PAYMENTS TO ENTER:
    THIS KEY IS PRESSED WHEN YOU HAVE ENTERED ALL YOUR PAYMENTS
    FOR THE DAY AND ONLY SYSTEM PROCESSING IS REQUIRED.
(PF6) VIEW/CORRECT PAYMENTS IN ERROR:
    THIS KEY IS PRESSED WHEN YOU HAVE ENTERED ALL YOUR PAYMENTS
    FOR THE DAY AND ONLY SYSTEM PROCESSING IS REQUIRED.
(PF6) VIEW/CORRECT PAYMENTS IN ERROR:
    THIS KEY IS PRESSED WHEN YOU ARE READY TO VIEW AND CORRECT
    ANY ACCOUNTS THAT WERE REJECTED.  THE ACCOUNTS IN ERROR WILL
    BE DISPLAYED ON THE INPUT PAYMENT SCREEN.  IF PLEASE CONFIRM
    YOUR PREVIOUS SELECTION PF4 OR PF6 IS DISPLAYED, PRESSING
    THIS KEY WILL ERASE THE SCREEN AND DISPLAY THE NEXT GROUP OF
    ACCOUNTS IN ERROR.  IF ADDITIONAL PAYMENT INPUT NOT ALLOWED
    IN CORRECTION/VERIFICATION MODE IS DISPLAYED.  YOU MUST
    CORRECT OR VERIFY PAYMENTS DISPLAYED BEFORE ADDITIONAL
    PAYMENTS CAN BE ENTERED.
THE CAPSLOCK KEY MUST BE ON TO USE CAPITALIZATION AND OFF TO
ACTIVATE JUMP KEY.  THE NUMLK KEY MUST BE ON TO USE THE NUMERIC
KEY PAD.
                 ENTER TO CONTINUE

FIG. 24B

PAYMENT PROCESSING RESULTS

FOR

NUMBER

PAYMENTS ENTERED:            0

PAYMENTS PROCESSED:          0

PAYMENTS REJECTED:           0

PAYMENTS TO CORRECT:         0
 (OR ACKNOWLEDGE)

NOTE!!!

TO VIEW AND CORRECT PAYMENTS REJECTED, PLEASE PRESS PF6

PF3=ENTER MORE PAYMENTS   PF4=MAIN MENU   PF6=VIEW/CORRECT PAYMENTS
 ALL PAYMENT PROCESSING IS COMPLETE.

FIG. 25

PAYMENT RESTART STATUS

FOR

NUMBER

PAYMENTS ENTERED:

PAYMENTS PROCESSED:

PAYMENTS REJECTED:

PAYMENTS TO CORRECT:
 (OR ACKNOWLEDGE)
PAYMENTS TO VERIFY:

PLEASE, PRESS (PF3) TO CONTINUE

SOME ACCOUNTS WILL NEED TO BE VERIFIED.

FIG. 26

RESTART PROCESSING
ATTENTION!!!

THIS SCREEN IS BEING DISPLAYED TO NOTIFY YOU THAT ALL ACCOUNTS
ENTERED PREVIOUSLY WERE NOT SUCCESSFULLY PROCESSED. THIS SITUATION
COULD HAVE BEEN CAUSED BY SOME SORT OF SYSTEM FAILURE, OR THE
BRANCH TERMINAL OPERATOR MAY HAVE DECIDED TO TERMINATE THE
APPLICATION BEFORE ALL THE ACCOUNTS ENTERED WERE SUCCESSFULLY
PROCESSED.

IT IS RECOMMENDED THAT RESTART PROCESSING (PF5) BE SELECTED. IF
RESTART PROCESSING IS SELECTED, ADDITIONAL SCREENS WILL BE DIS-
PLAYED TO INFORM YOU OF THE STATUS OF ACCOUNTS SUCCESSFULLY AND
UNSUCCESSFULLY PROCESSED. YOU WILL ALSO BE ALLOWED TO ENTER
ADDITIONAL ACCOUNTS TO BE PROCESSED FOR THE SAME DATE.

IF RESTART PROCESSING IS NOT SELECTED (PF3), ANY ACCOUNTS
PREVIOUSLY ENTERED AND NOT SUCCESSFULLY PROCESSED WILL HAVE TO BE
REENTERED.

IF YOU HAVE ANY QUESTIONS OR WOULD LIKE ASSISTANCE, PLEASE CONTACT
BRANCH SUPPORT.

PF3 =NORMAL PROCESSING          PF5 =RESTART PROCESSING

FIG. 27

ACCOUNT VERIFICATION

ATTENTION!!!

ACCOUNTS DISPLAYED ON THE NEXT SCREEN MAY NOT HAVE BEEN PROCESSED
SUCCESSFULLY BECAUSE OF A SYSTEM PROBLEM. REVIEW YOUR TRANSACTION
JOURNAL TO DETERMINE WHICH ACCOUNTS HAVE BEEN PROCESSED AND REMOVE
THEM FROM THE NEXT SCREEN BY SPACING THROUGH OR KEYING OVER THEM.

PLEASE PRESS (PF3) TO GO TO THE NEXT SCREEN

FIG. 28

FINANCIAL DATA PROCESSING SYSTEM WITH DISTRIBUTED DATA INPUT DEVICES AND METHOD OF USE

This Application is a Continuation-In-Part of presently co-pending Application Ser. No. 750,912, filed July 1, 1985 now U.S. Pat. No. 4,774,664, issued Sept. 27, 1988 for FINANCIAL DATA PROCESSING SYSTEM AND METHOD, which is hereby incorporated by reference.

FIELD OF THE INVENTION

This invention relates to a financial data processing system and a method of operating the system for keeping accounts of loans, loan histories, leases and other financial transactions, and pertinent information relevant to each loan, lease and transaction.

More particularly, this invention relates to a financial data processing system having a "level" of distributed processors, such as micro-computers which also are known as personal computers ("PC's"), coupled to a higher "level" of mini-computers, such that the micro-computers are directly connected to and interface with the mini-computers, and although not directly connected to a host computer, are capable of communicating with it via the mini-computers.

This invention further relates to a financial data processing system having a lower level of distributed processors at the micro-computer level, which are capable of receiving user input data in real-time and providing a temporary storage of such data in a memory storage device of the micro-computer or in a more permanent storage medium such as a disk file readable by the micro-computer, for either processing by the micro-computer or for later transmission to and processing by the next-higher level of distributed processors, e.g. the mini-computers, in batch-mode.

This invention also relates to a financial data processing system having the capability of inputting data in real-time using means other than a conventional computer keyboard to enter the data, particularly such as by means of using an optical character reader directly connected to computer memory storage means.

BACKGROUND OF THE INVENTION

Prior to the invention described below, financial data processing, utilizing a system such as is described in our co-pending U.S. Pat. Application, Ser. No. 750,912, was performed using an essentially bi-level system comprising a plurality of distributed processors at the mini-computer level, each having a plurality of interactive video display terminals ("VDT's") and other peripheral equipment, such as printers, associated therewith, with each distributed mini-computer processor further being connected to and interfacing with a mainframe host computer.

Although this bi-level system operates satisfactorily, it is believed that the efficiency of the overall system can be improved. The operation of this system is dependent, to a large part, on the rate at which data can be input into the system by the individual operators using the VDT's connected to the distributed mini-computer processors, in real-time, and in a time-sharing mode. The capability of each individual distributed mini-computer processor to accept data being input thereto greatly exceeds the rate at which individual operators can manually input such data via the computer keyboard. The full data processing capability of the mini-computers, moreover, is not utilized even where a plurality of VDT's are connected thereto in time-sharing mode. The system is limited, in some instances, particularly at large branch office sites, by the relatively small number of VDT's which can actually be connected to a single distributed mini-computer because of hardware limitations, such as the number of VDT ports that a single mini-computer can accommodate. In other instances, the full data processing capability of the mini-computer is not utilized because of the relatively small number of VDT's, less than the maximum number which can be connected to a single mini-computer in time-sharing mode, which actually interface with a single mini-computer serving one or more branch offices. Finally, even when a plurality of VDT's connected to a mini-computer are simultaneously being utilized for the manual input of data into the memory storage devices associated with the mini-computer, in real-time, or time-sharing modes, since the process is relatively slow it prevents the mini-computer from performing other important processing tasks internally.

For these reasons, a further improvement to the financial data processing system as set forth in co-pending U.S. Pat. Application Ser. No. 750,912, has been developed specifically to overcome the above limitations and to avoid unduly restricting the processing capability of the mini-computers in the system by releasing them from the function of processing input data being entered into the system by relatively slow-speed manual entry via keyboard from VDT's connected to the mini-computer in time-sharing mode, thereby increasing the overall data processing efficiency of this system.

OBJECTS OF THE INVENTION

Therefore, it is object of the present invention to provide a further, lower level of data entry and distributed processing capability for the overall financial data processing system of our invention, by means of a network (or subsystem) of micro-computers, also generally known as personal computers, below the level of the mini-computers. This sub-system is provided in order to facilitate the entry of data into the financial data processing system by first inputting data into the micro-computers either by direct manual entry of the data from the micro-computer keyboard (i.e. from the level of micro-computers coupled to a mini-computer), or alternatively, by means of an optical character reader to enter and store the data. The input data is copied onto a permanent storage means (such as a floppy or hard disk) of the micro-computer from the volatile working storage memory, for more permanent storage. After a batch of data has been so accumulated, the data is transmitted to the next-higher level of distributed processors, i.e. the mini-computer connected thereto, by means of a communication interface and link, such as a modem and standard telephonic communication line, or by means of an optical fiber link, connecting the micro-computer to a mini-computer. The transmitted data is then entered into a direct access memory storage device connected to the mini-computer, for master file updating and for further processing of the data.

A further object of this invention is to provide a financial data processing system having a lower level of distributed processors, i.e. micro-computers, connected to a next-higher level of distributed processors, i.e. mini-computers, the latter being connected to a mainframe central host computer, such that the individual microcomputers are capable of inputting file data into the system relating to all financial functions performed by the system, in real-time. The inputted data subsequently is transmitted to the mini-computers for file updating and data processing in high-speed batch mode. Thus, the central processing units of the mini-computers are thereby utilized more efficiently.

Various other objects, advantages and features of the present invention will become readily apparent from the detailed description that follows, and the novel features of the invention are particularly pointed out in the appended claims.

SUMMARY OF THE INVENTION

Heretofore, a financial data processing system utilizing several levels of interactively linked distributed processors has not been possible because of the unavailability of system operating and control software to accomplish such an objective. The financial data processing system of the present invention, which integrates a micro-computer sub-system with a higher level of distributed processor, therefore, represents a significant advancement of the state of the art. The system of this invention is made possible by adapting Application Program Interface ("API") software developed by IBM to the particular requirements of the financial data processing field.

API software provides the means for operating an integrated hardware system, such as that of the present invention based on PC's and mini-computers. The API software enables hardware sub-systems to be linked in a way that permits the exchange of data between the PC and the mini-computer and allows the PC to perform certain designated processing functions, such as high volume, routine data processing operations, thereby freeing the central processing unit of the mini-computer to perform other tasks. Through the adaption and use of API software, the overall capabilities, flexibility, operating speed and efficiency of the integrated financial data processing system are greatly enhanced.

In the present invention, the API software has been modified to create an integrated system of hardware which links one or more PC's to at least one mini-computer. The system is structured in such a way as to provide an essentially unidirectional flow of operational control which is established from the PC and can be extended to the mini-computer for select designated operations. A tie-in from a PC to the mini-computer is initiated from the PC. The link enables the PC to interrogate the mini-computer and obtain data from data files corresponding to the designated functions which the PC's are authorized to access. For certain operations, the PC's may have "read only" access to data contained in files at the mini-computer level. For other operations, particularly those involving the processing of data which is used to update information in the permanent data files at the mini-computer level, the PC's have the further capability of transmitting the processed data to the mini-computer and writing the data to memory at that level. A step-by-step detailed description of how the system operates is presented below.

The PC/mini-computer interface is also structured such that, on the other hand, the mini-computer cannot independently access a PC and transfer data to it at the mini-computer's instance. Data transfer from the mini-computer to a PC must be initiated as a request from the PC.

In accordance with a broad, general feature of this invention, a financial data processing system and a method of operating that system are provided. Included in this system are a central processor with a data bank into which financially-related data is written and from which data is read. Also provided is a higher level of distributed processors with associated direct access storage devices and other peripherals, including video display terminals (VDT's) and printers, into which data is also written and from which data is also read. This higher level of distributed processors (mini-computers) performs data processing for substantially all financial functions programmed into the system. The aforesaid elements of the system hardware and the financial functions performed by the system are more fully described in co-pending U.S. Pat. Application Ser. No. 750,912. Also integrated as part of the overall system, as particularly disclosed in the present specification, is a second, lower level of distributed processors, for example, micro-computers which are used essentially to input data into the system in real-time and to retrieve data processed or otherwise provided at the mini-computer level for real-time display and/or printout.

The financial data maintained and processed by the functions performed by the system, and which the micro-computers are capable of inputting, accessing and transmitting interactively with the system include, but are not limited to, financial loan information representing the balance of outstanding loans, the interest rate payable on a loan, the principal and interest due and payable for each periodic loan payment, information on the identity of each debtor, a record of any delinquency in payment of a loan, the cumulative collection histories of each loan and financial information relating to leases and leased property.

The input means of each micro-computer, including, e.g. a keyboard or an optical character reader, are operable to write into the memory storage area of the micro-computer, and optionally, to store on a disk file of the micro-computer, data pertaining to financial loan information. In particular, this includes multiple loan payment data representing principal and interest payments and the identities of respective debtors, for a batch of loan payments, multiple lease payment data, and loan application data representing the identity of each applicant, the amount, type and duration of the requested loan, the interest rate payable on the requested loan and credit data representing the applicant's ability to repay the requested loan.

The display means of each micro-computer, such as a video display screen or the like, is operable to display data stored in and read from memory storage of the microcomputer or from a disk file. Data can be input to memory storage from a keyboard for newly entered data or it can be input by reading-in previously entered data which has been retained on a disk, from a permanent disk file. Disk files, containing previously entered data, are a convenient means of playback for the purpose of verification and/or reentry. The display means of the micro-computers are also operable to access and retrieve processed data directly from the mini-computers or from the central host computer, via the mini-computers.

In a preferred embodiment, each micro-computer, such as an IBM 3270-PC, is provided with a keyboard, a multi-colored video display screen, a memory storage area for the micro processor, means such as a floppy disk drive or a hard disk drive, for permanently recording data that has been entered into the memory storage and, alternatively for transferring data therefrom into the memory storage. Optionally, an optical character reader is used as an alternative to the manual entry of data from the keyboard.

Each micro-computer is connected to a direct access peripheral storage device associated with the next-higher level of distributed processor, i.e. a mini-computer such as an IBM 8100 processor/8101 storage device combination. The mini-computer systems, with which the micro-computers are interconnected may include one or more additional memory storage devices, such as an IBM 8102 and one or more tape drive units, such as an IBM 8809. A full description of the operation of the mini-computer system and the financial data processing functions which are performed at this level of the overall system is described in the co-pending application referred to above and is not herein described in detail. A detailed description of the operation of the micro-computer level of distributed processors in conjunction with the operation of the overall system is discussed below, with particular emphasis on a detailed description of the operation of these terminals in performance of the multiple payment processing function.

BRIEF DESCRIPTION OF THE DRAWINGS

The following detailed description is best understood in conjunction with the accompanying drawings in which:

FIGS. 1-3; 4A-B; 5; 5a; 6A-C; 7-9; 10A-B; 11A-C; 12-20 as described in our co-pending U.S. Pat. Application referred to hereinabove.

FIG. 23A is a display of the personal computer (PC) main menu for the customer payments multiple mail option.

FIG. 23B is an illustration of the PC display screen for the main menu help map.

FIG. 24A is a representation of the PC display screen for the input of payment data.

FIG. 24B is a representation of the PC display screen for the multiple input help map.

FIG. 25 is a representation of the PC display screen for the payment input results.

FIG. 26 is a representation of the PC display screen for the payment restart status map.

FIG. 27 is a representation of the PC display screen for the payment and help screen restart.

FIG. 28 is a representation of the display screen for the instructions for the input data verification procedure.

DETAILED DESCRIPTION OF A PREFERRED EMBODIMENT

The following detailed description is intended to provide an understanding of the method of operation of the micro-computer sub-system of the present invention, which is a part of the overall financial data processing system described in detail in co-pending U.S. Pat. Application, Ser. No. 750,912. Particular emphasis is given in the following to application of the micro-computer sub-system of the present invention to the multiple payment processing financial transaction option. It is to be understood, however, that the micro-computer sub-system of the present invention can generally be utilized to perform any of the financial data processing transaction options which can be selected by the user from the main menu of all financial transactions that may be carried out by the overall system as described in the aforementioned patent application. The specific sequence of steps followed in the performance of other options varies accordingly. The determination of the specific steps for other financial transaction options will be obvious to one skilled in the art of computer programming based on the disclosure herein and on the disclosure in our above mentioned co-pending application.

Figure 1:
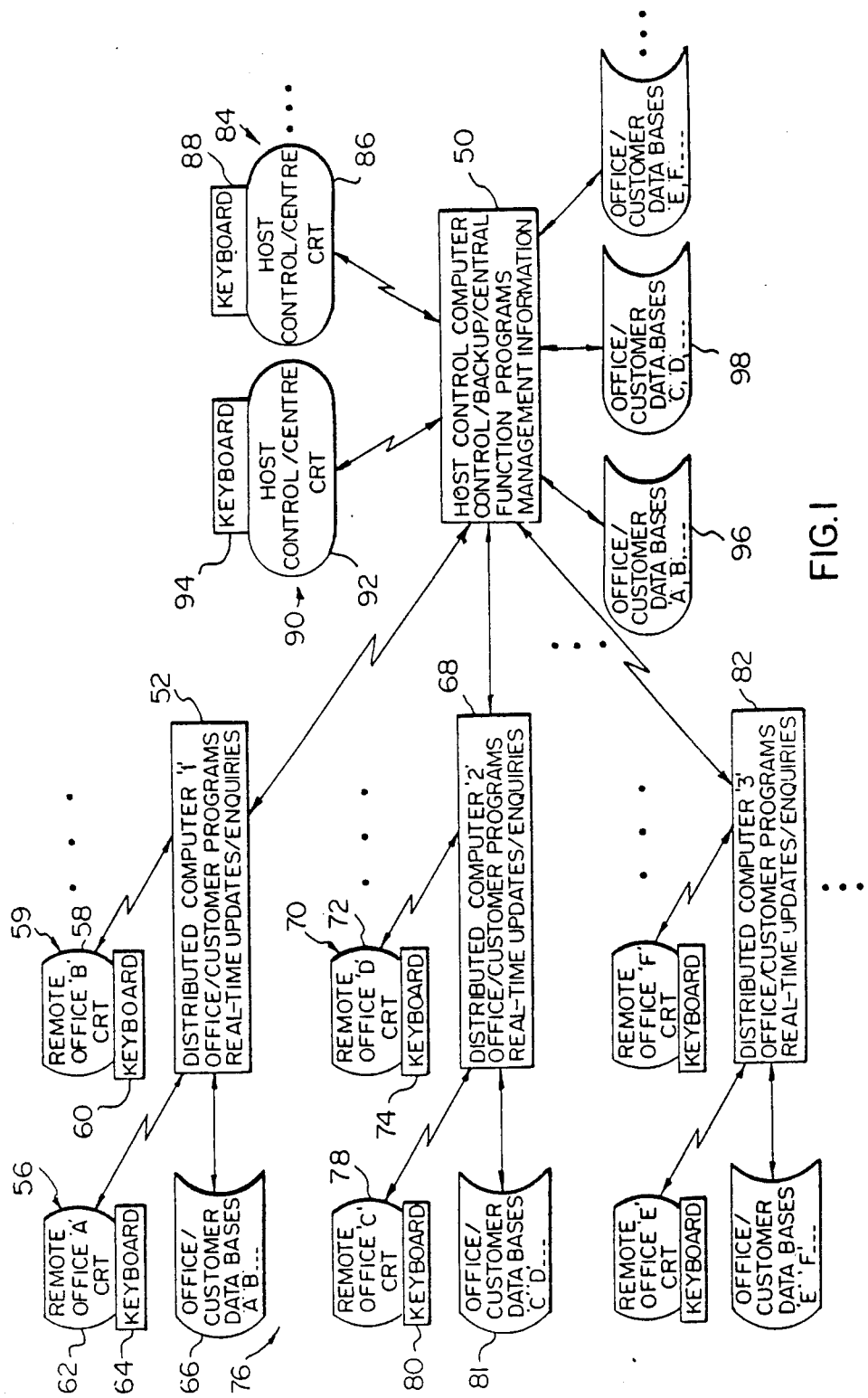
Figure 2:
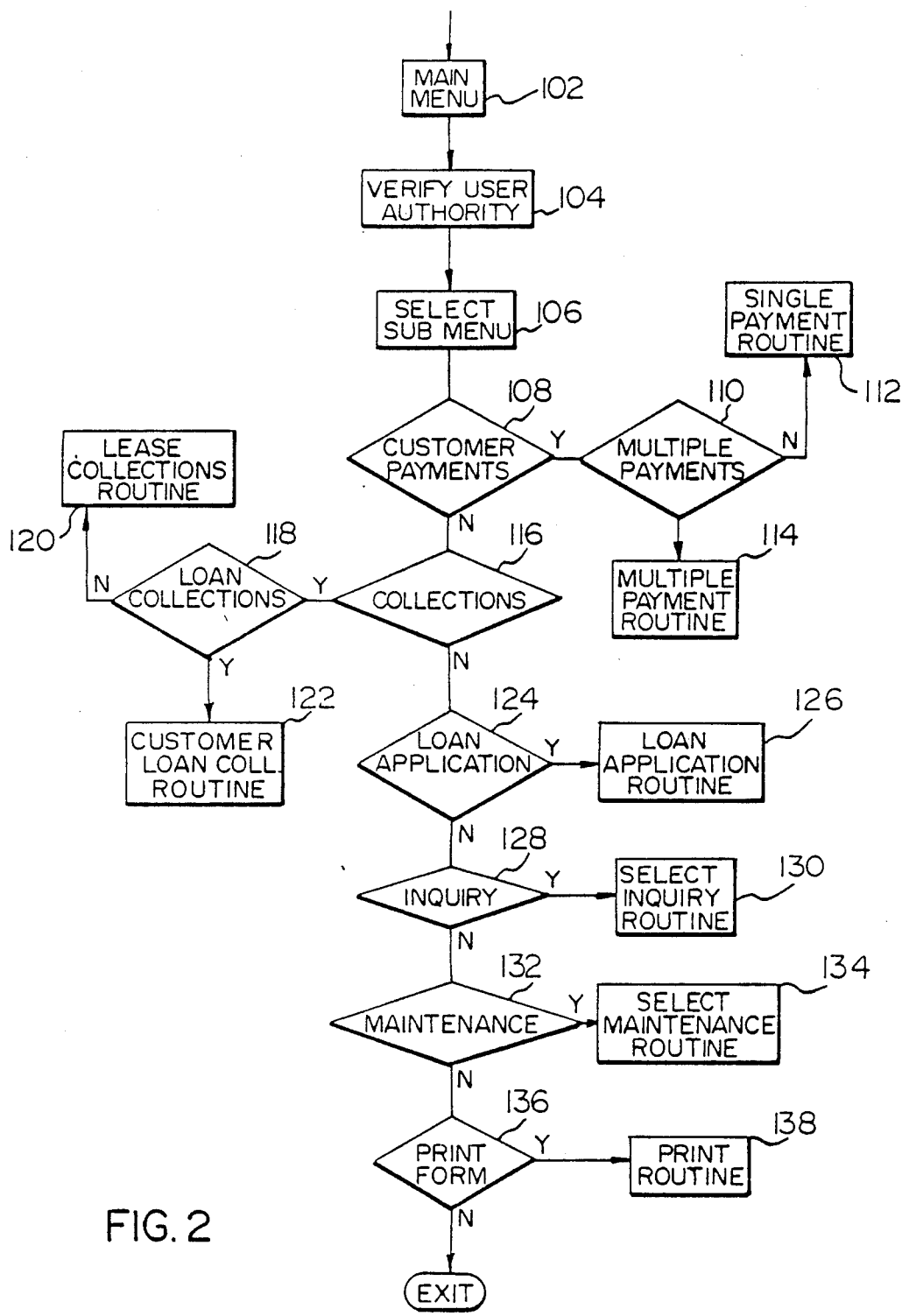
Figure 4A:
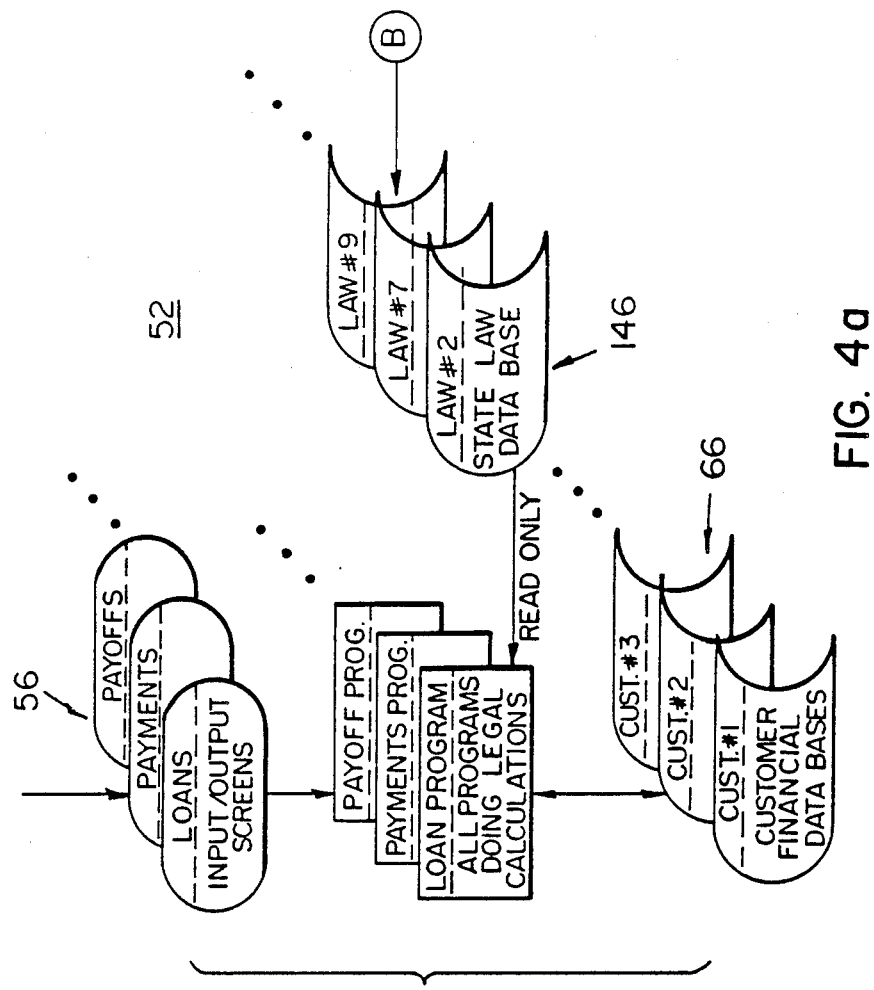
Figure 4B:
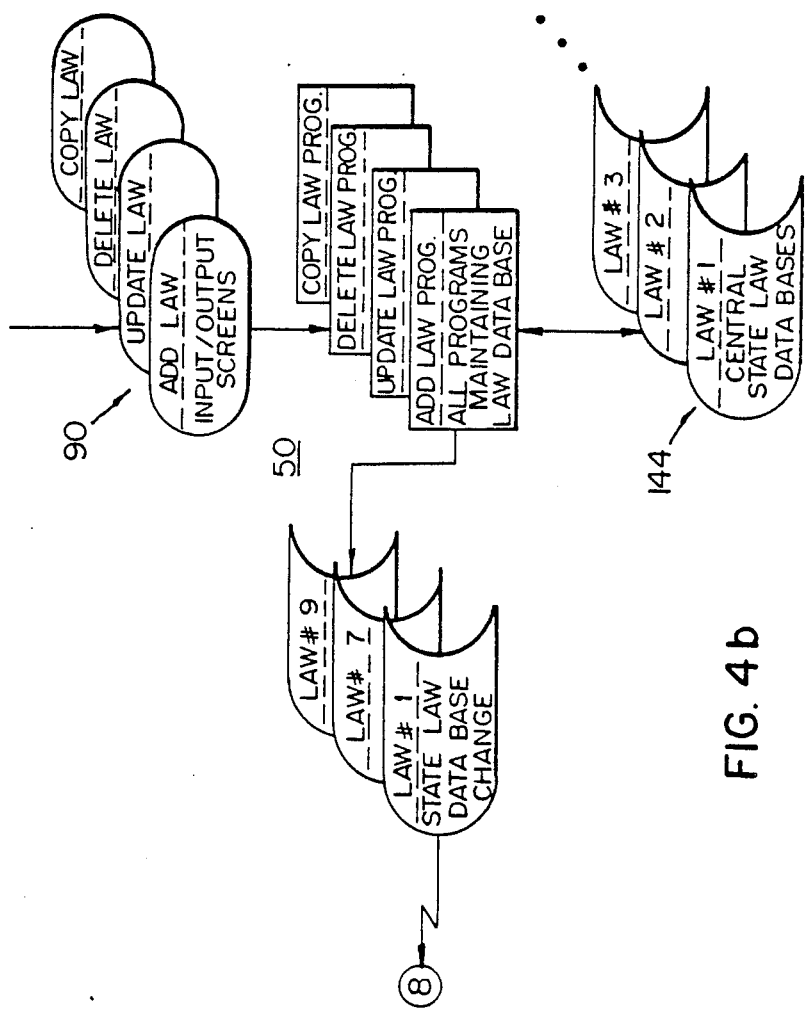
Figure 5:
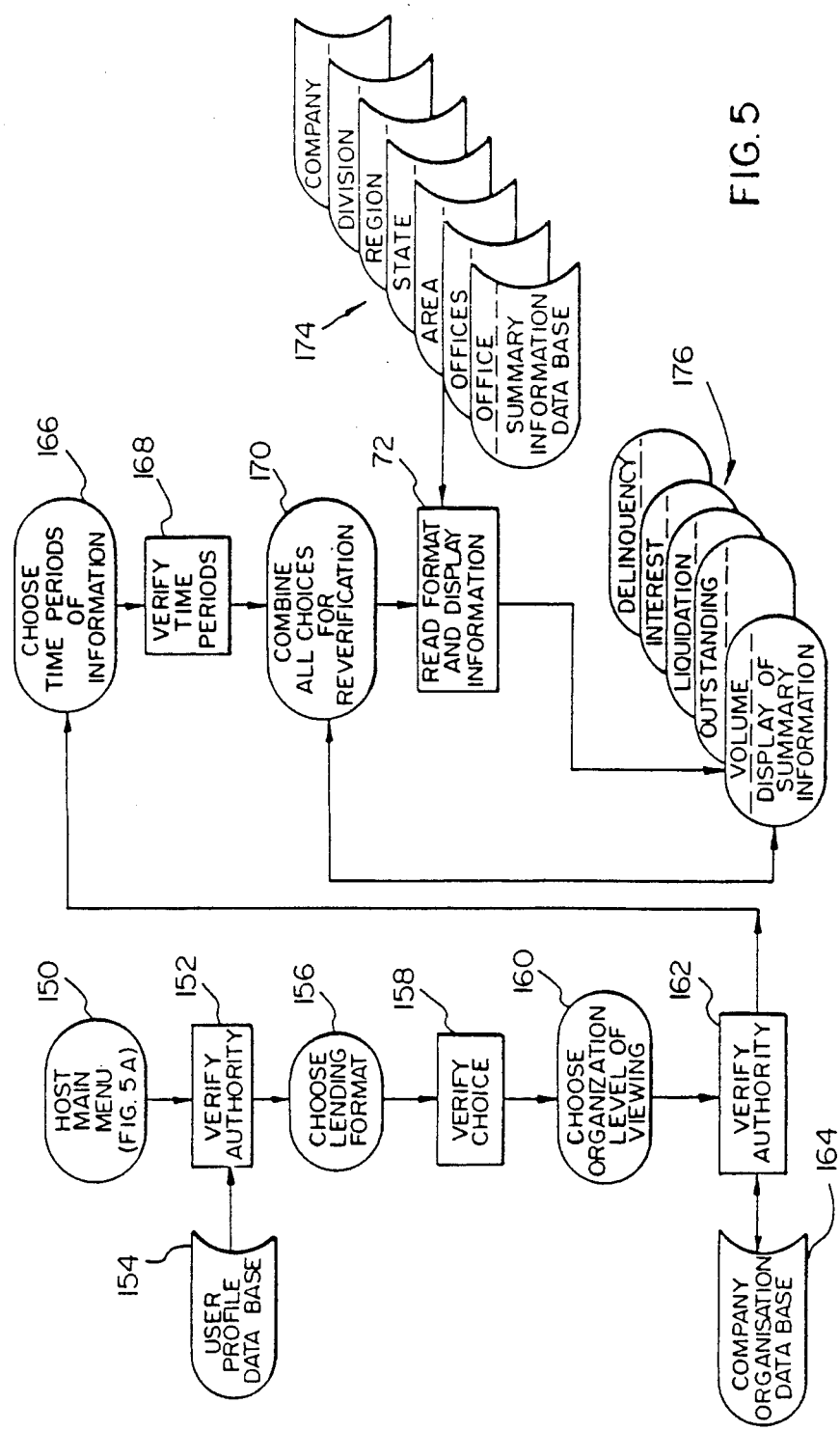
Figure 6A:
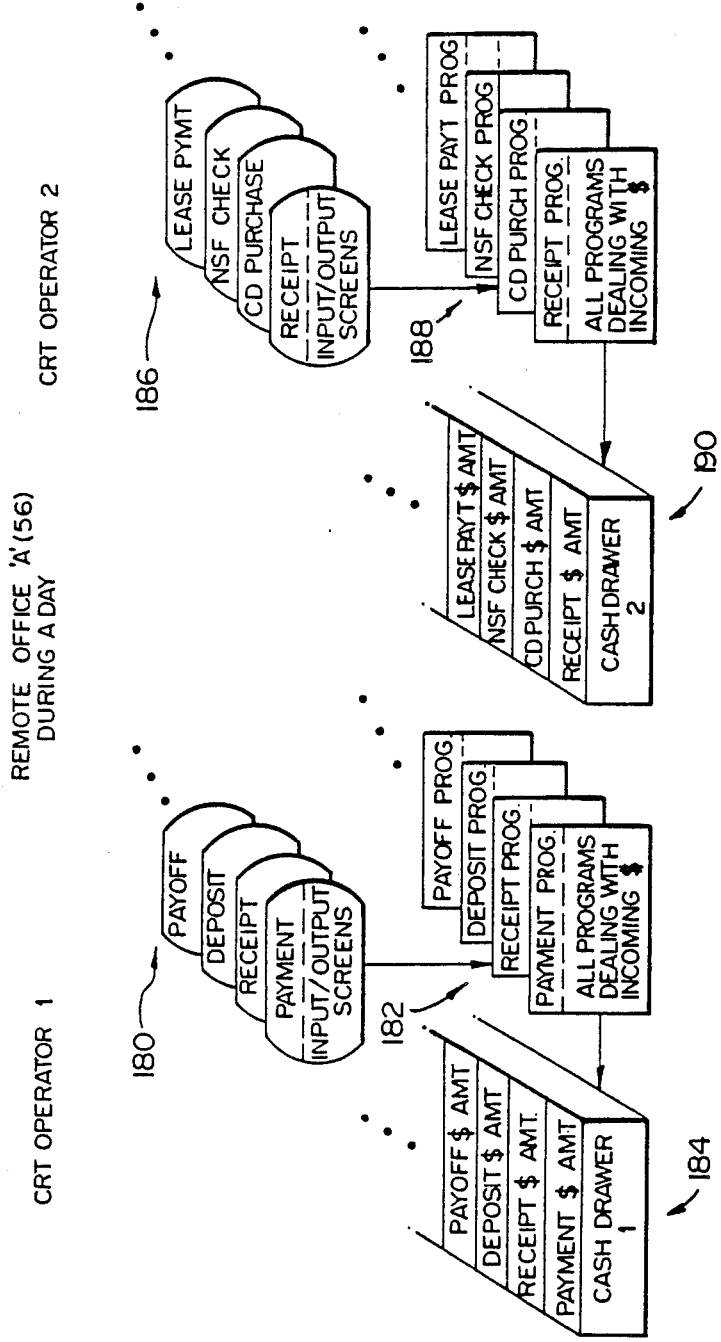
Figure 6B:
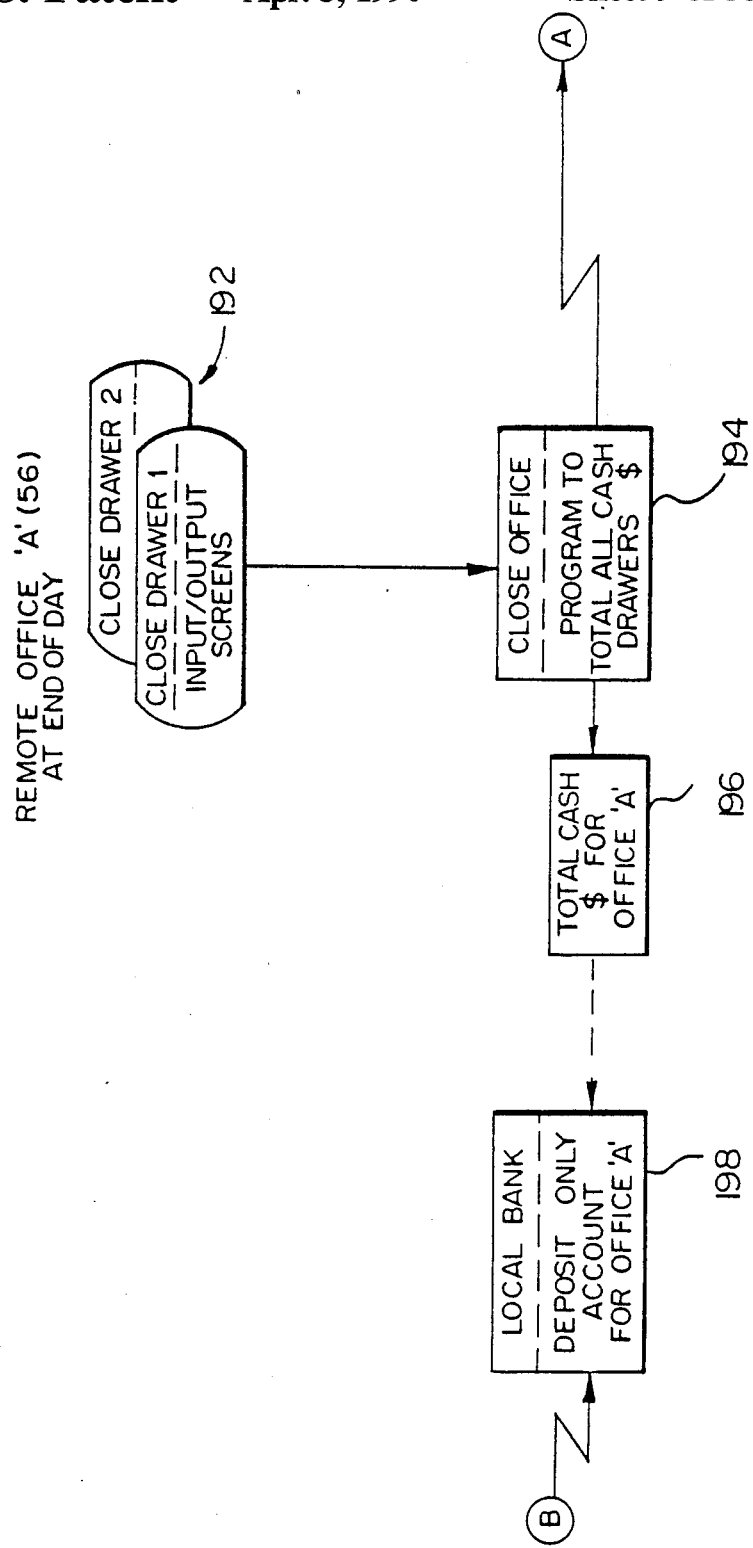
Figure 6C:
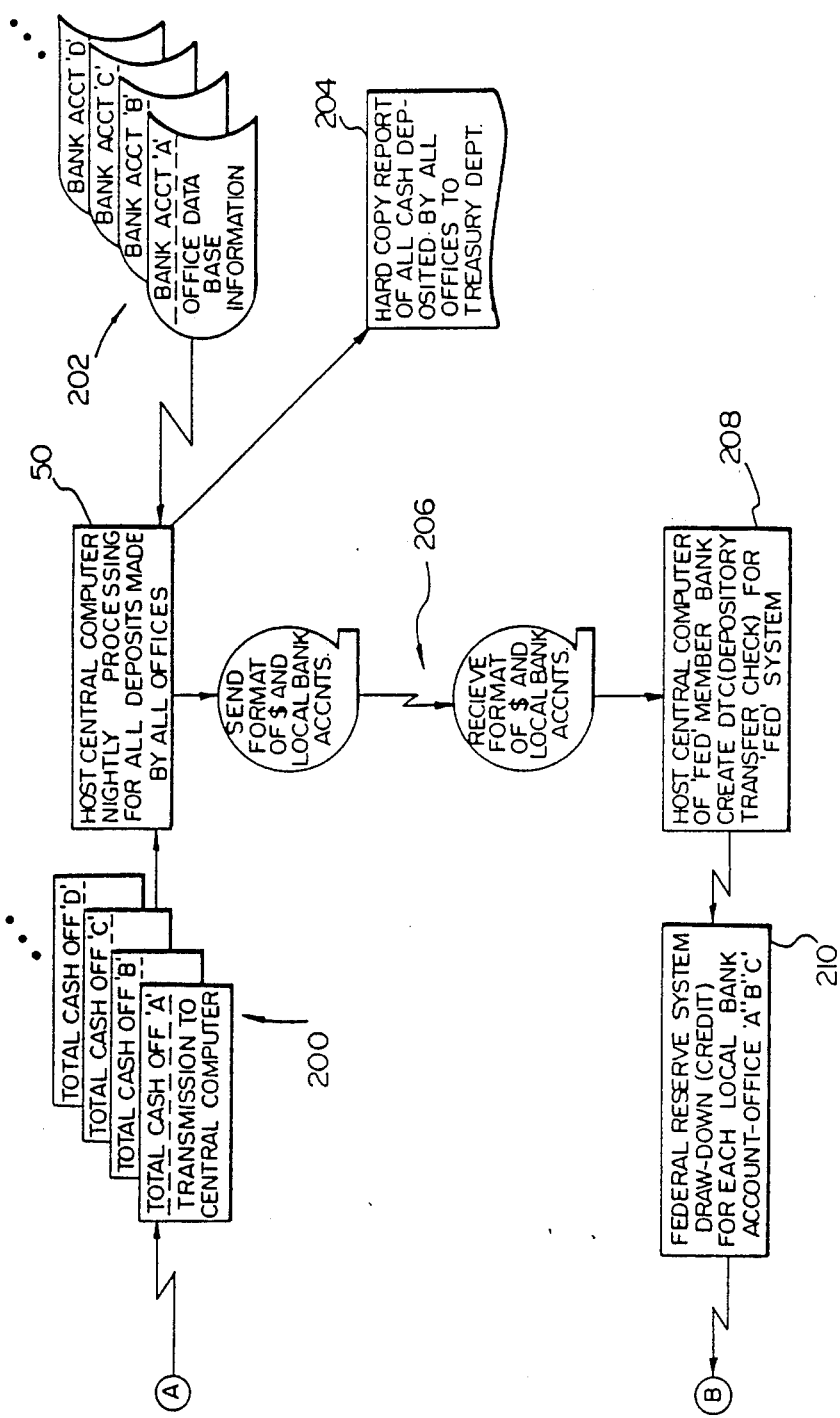
Figure 10A:
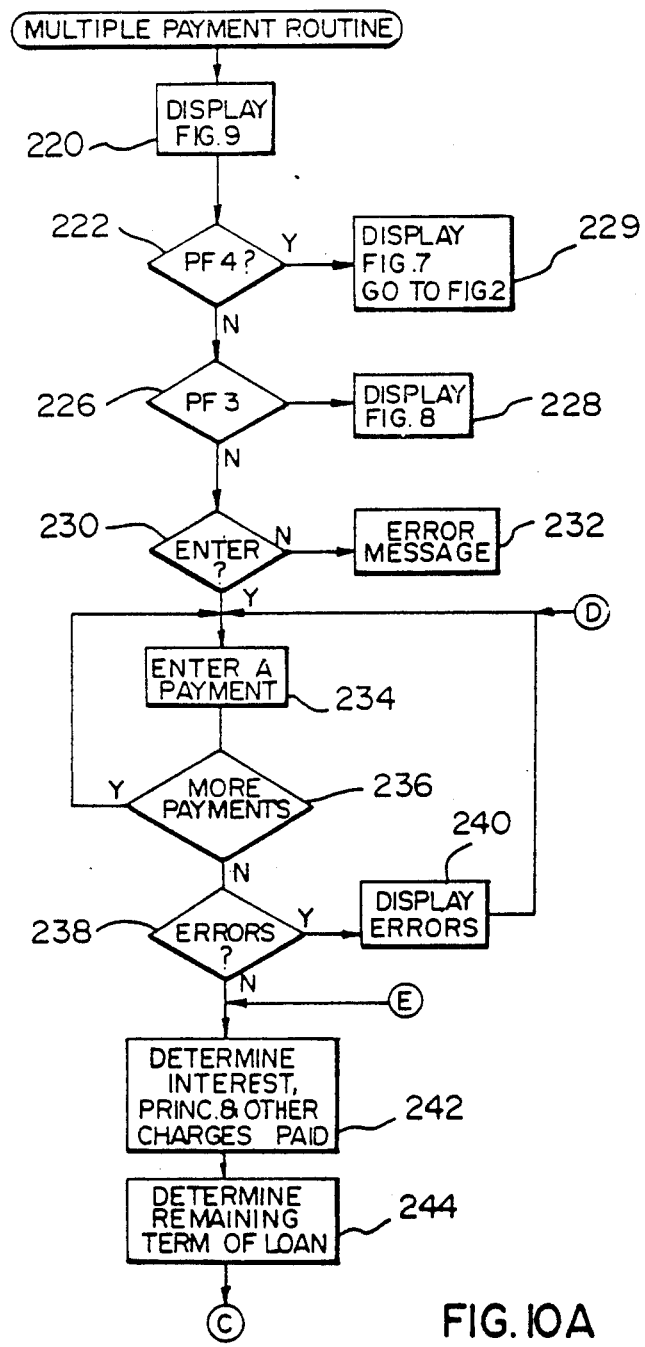
Figure 10:
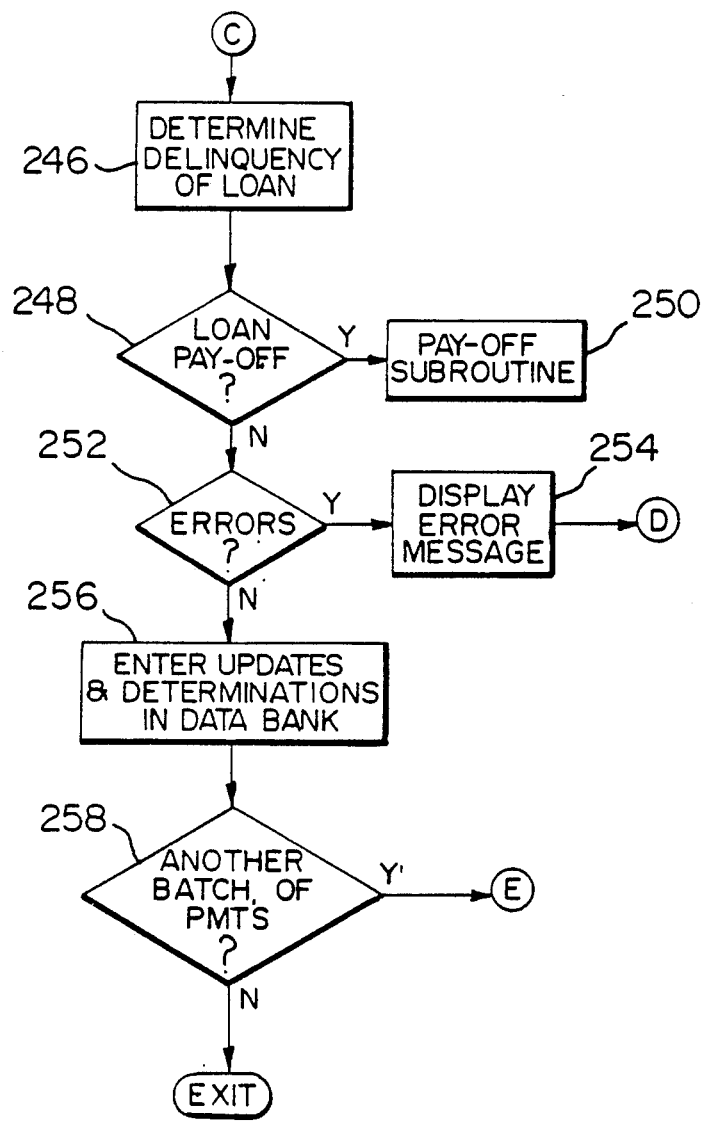
Figure 11B:
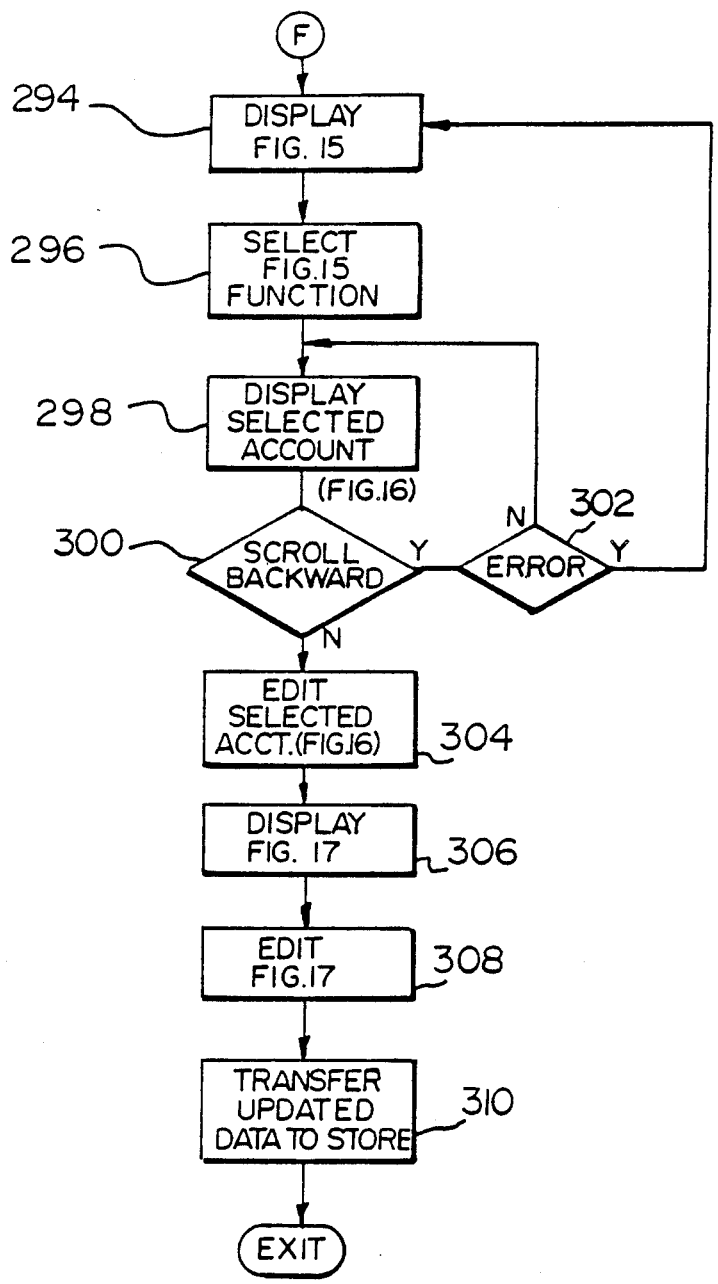
Figure 11C:
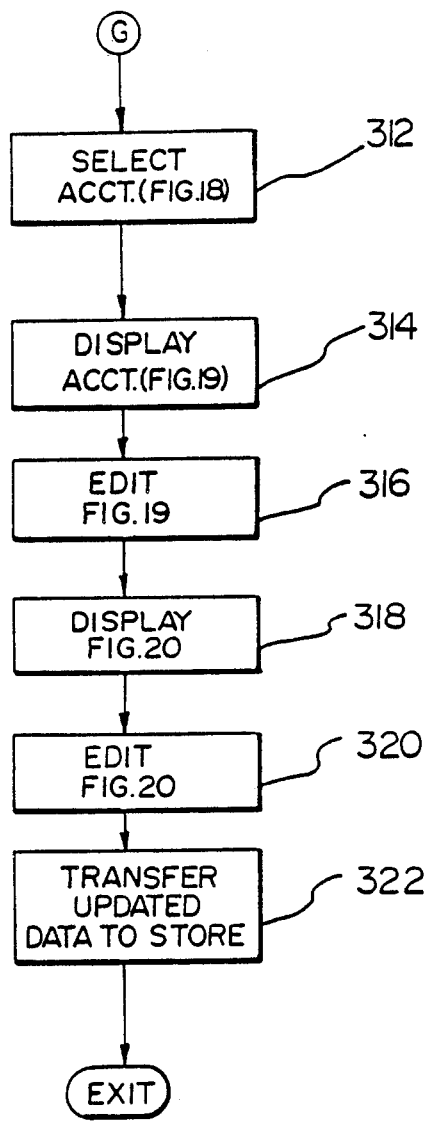
Figure 21:
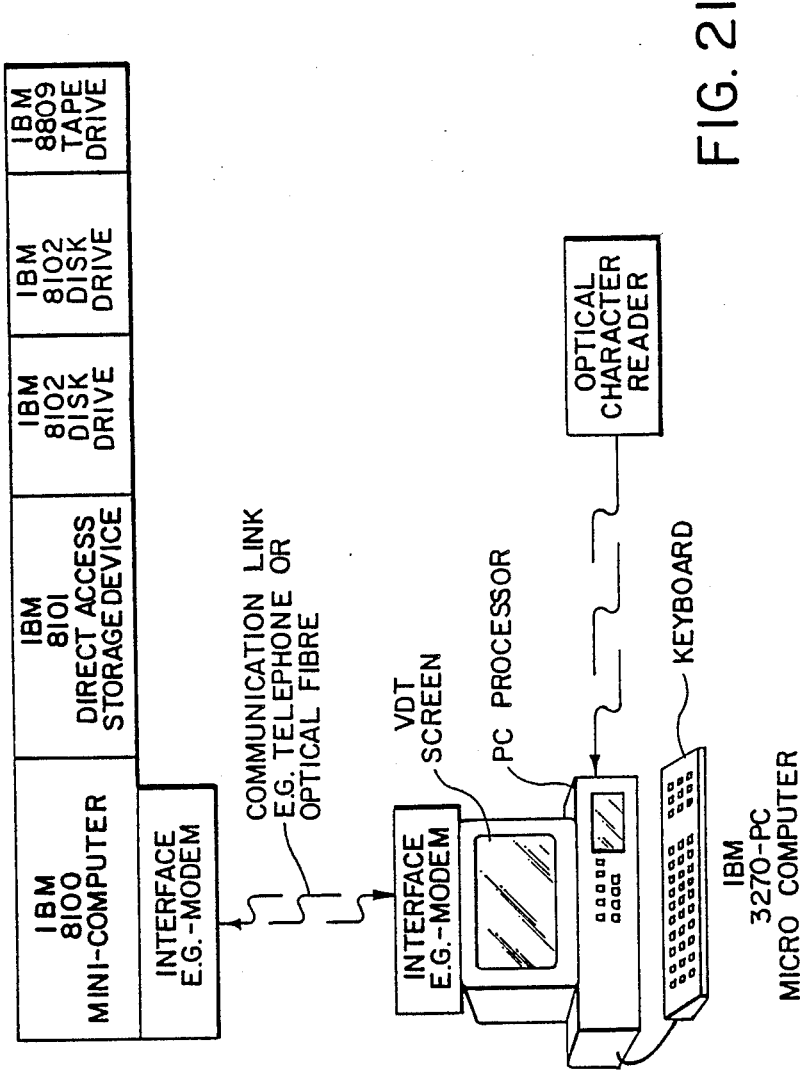
FIG. 21 is a schematic representation of the components of the micro-computer sub-system and their relationship to one another and to the mini-computer level of distributed processors.

FIG. 21 is an overall view of a micro-processor terminal as utilized according to the invention, including a keyboard, central processing unit (CPU) and a video display terminal (VDT), together with an optical character reader (OCR) for alternative means of data entry into the CPU instead of the keyboard. Also shown is a data communications link between the micro-computer sub-system and the next highest "level" of distributed processor in the overall financial data processing system, namely the mini-computer level, utilizing, for example, an IBM 8100 mini-computer and its peripherals such as an IBM 8101 direct access storage device, one or more IBM 8102 disk drives and an IBM 8809 tape drive for tape back-up of data stored on hard disk. The two-way data transmission link between the micro-computer and mini-computer sub-systems is established with an appropriate interface at each terminal, such as a modem in the case of interconnection over conventional telephonic lines. Alternatively, a fiber optic link can be established between the two systems. Several micro-computers may be coupled to a common mini-computer subsystem.

Figure 22A:
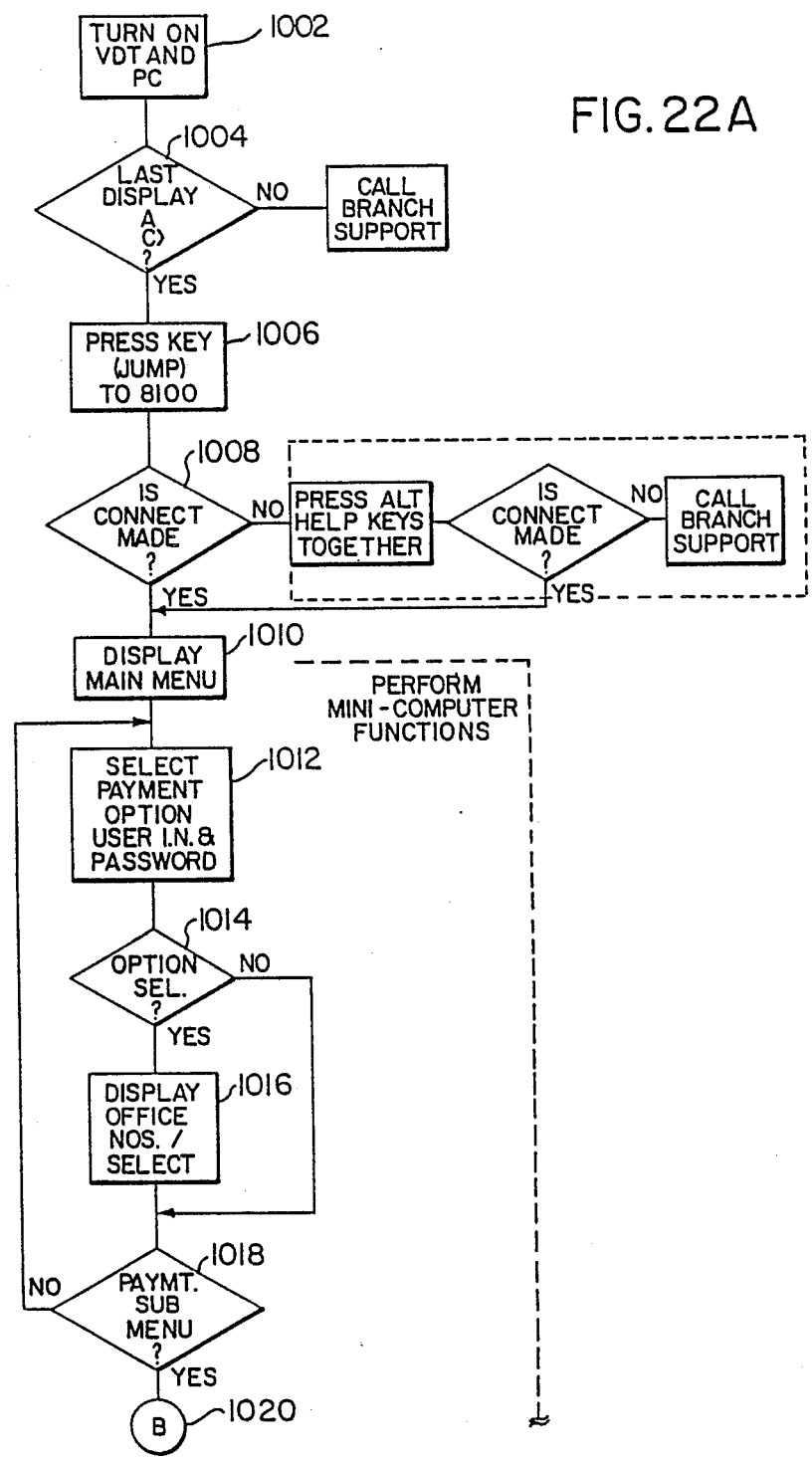
FIGS. 22A-22E are a flow chart representation of the program which the micro-computer sub-system utilizes to perform the operation of data input for the multiple payment processing function.

Referring to FIG. 22A, the operator first turns on the VDT and PC of the micro-computer subsystem as at 1002 of the illustrated multiple payment processing flow chart. Assuming the PC is provided with a hard disk drive, the VDT screen shows a c> prompt as the last symbols echoed to the VDT, as is conventional. If the c> prompt is not shown on the screen, the operator is put on notice that there is a PC problem as represented by the inquiry at 1004, that the system is not operating properly and that branch support, which is a central user help desk, should be contacted to determine the nature of the problem and to provide assistance. If the c> prompt is properly shown on the screen, the inquiry at 1004 is answered in the affirmative and the operator is apprised that he may proceed with the session. The operator next presses the designated key (JUMP) or combination of keys to tie-in the PC to the mini-computer, such as IBM 8100, with which it interfaces, as at 1006. This interconnection can be established by means of a modem utilizing standard telephonic communication lines or the interface can be established by means of other devices such as a dedicated fiber-optic link. If a successful interconnection is not confirmed, the inquiry at 1008 is answered in the negative and the operator may first take corrective measures on his own, and if still unsuccessful in establishing a link-up, he may call on branch support for assistance. When a link-up is successfully established, the inquiry at 1008 is answered in the affirmative and the operator proceeds by logging-on to the system main menu, as at 1010. The Main Menu display screen is illustrated in FIG. 7. As an illustrative example, any one of eighteen separate financial transactions may be selected by the terminal operator. After selecting one of the transaction options, the operator enters a user identification number and password needed top verify that the operator has the authority to access the selected option, as at 1012. The program then checks at 1014 if the user has multiple office selection capability. If the inquiry is answered in the negative, the program bypasses the next step and advances to 1018 which requires the selection of a payment sub-menu. If the response to the inquiry at 1014 is in the affirmative, the program proceeds to 1016, requiring the selection of an input option number for the number of the user's branch office, as selected from a displayed screen of numbers for all branch offices. After a number has been entered by the user designating the user's branch office, the program then proceeds to 1018. If the response to the inquiry at 1018 is in the negative, this indicates that the payment option, option 4, was not selected by the operator and the program loops back to 1012. However, if the inquiry at 1018 is answered in the affirmative, the program advances to display the customer payments sub-menu on the VDT screen.

Figure 22B:
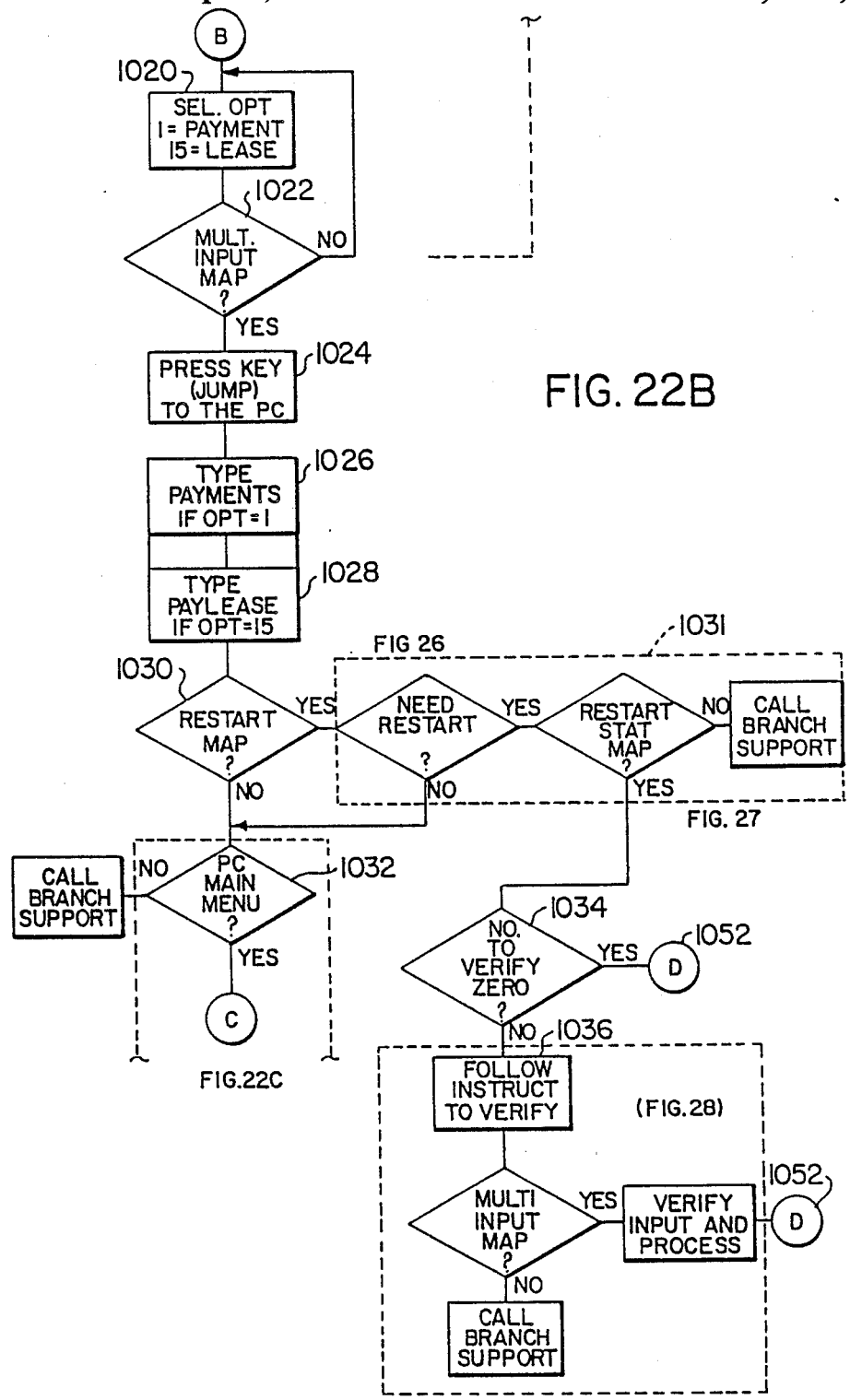

When an affirmative response has been made to the inquiry at 1018, the program advances to segment "B" on FIG. 22B. At this point, the VDT screen displays a menu similar to that shown in FIG. 8. Assuming as in the present embodiment, the financial transaction option to be selected is the multiple mail option of the customer payments transaction option, wherein batches of customer return mail payments are processed, the operator may select either option 1 relating to loan payments or option 15, relating to lease payments from the displayed menu. The program then ascertains at 1022 whether a Multiple Input Map is displayed. If the response to the inquiry at 1022 is in the negative, the program loops back to 1020. If the response to this inquiry is in the affirmative, the program advances to 1024 which requires the operator to press a key (JUMP) or combination of keys to the PC.

If option 1 for multiple mail customer payments has been selected, the operator then types the entry "PAYMENTS" at 1026. If option 15 has been selected, the operator types the term "PAYLEASE" at 1028.

The program then ascertains whether a RESTART is required, as at 1030. A RESTART enables the operator to resume a data entry session which may have inadvertently been terminated because of such factors as a break in the communication link to the mini-computer or due to some other hardware failure in the microcomputer or mini-computer system, resulting in the loss of part or all of the batch of data being input during that session. If the VDT screen displays a non-zero number count for the number of entries in the data files, thereby indicating that the data files contain previously input data which may have been either successfully or unsuccessfully processed, the user can institute a data verification procedure ("RESTART") which causes the previously input data to be redisplayed for review and entry of any corrections prior to attempting to reprocess the data. Where a previous session has been interrupted or has been terminated by other than the standard log-off procedures, to be described, the data files have a non-zero number count for the number of entries in the data files, therefore a RESTART procedure can be initiated to enable review of the existing data, and correction if required. If the RESTART procedure is elected, the user next determines whether a RESTART procedure which shows the status of each previously entered account is required. The inquiry at 1031 asks whether a RESTART is required. If the inquiry at 1031 is answered in the affirmative indicating that a RESTART has been requested, the program displays a Restart Status Map, which is a summary of the number of accounts previously entered and their processing status, as shown in FIG. 26. The user can then make appropriate corrections to the previously entered data. The program then continues to test whether the number of accounts to be verified has been reduced to zero by appropriate correction of the data in the accounts, as by the inquiry at 1034. If the number of accounts to be verified has been reduced to zero, the program jumps to segment "D", which causes the Multiple Input Map to be displayed, and sends the program into a new data input mode, wherein new payment data is entered for accounts. If the response to inquiry 1034 is in the negative, indicating that the number of accounts to be verified has not been reduced to zero, the program continues to 1036 which enables the user to take further steps to verify the data.

Figure 22C:
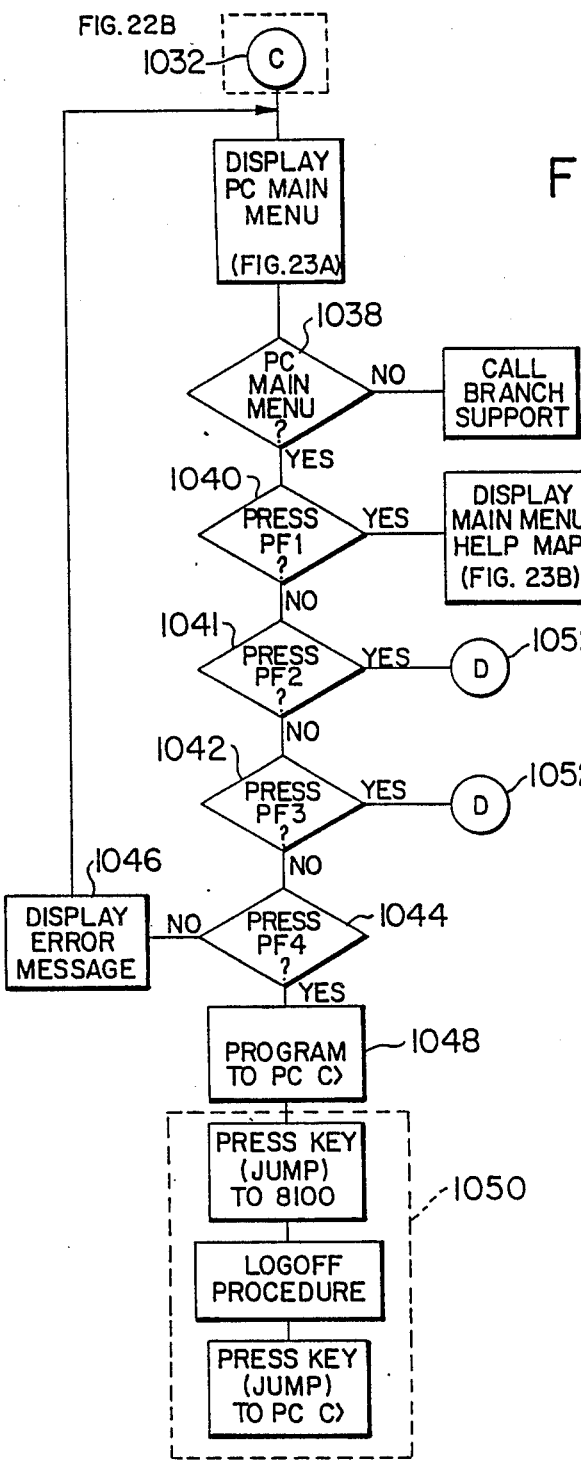
Figure 22D:
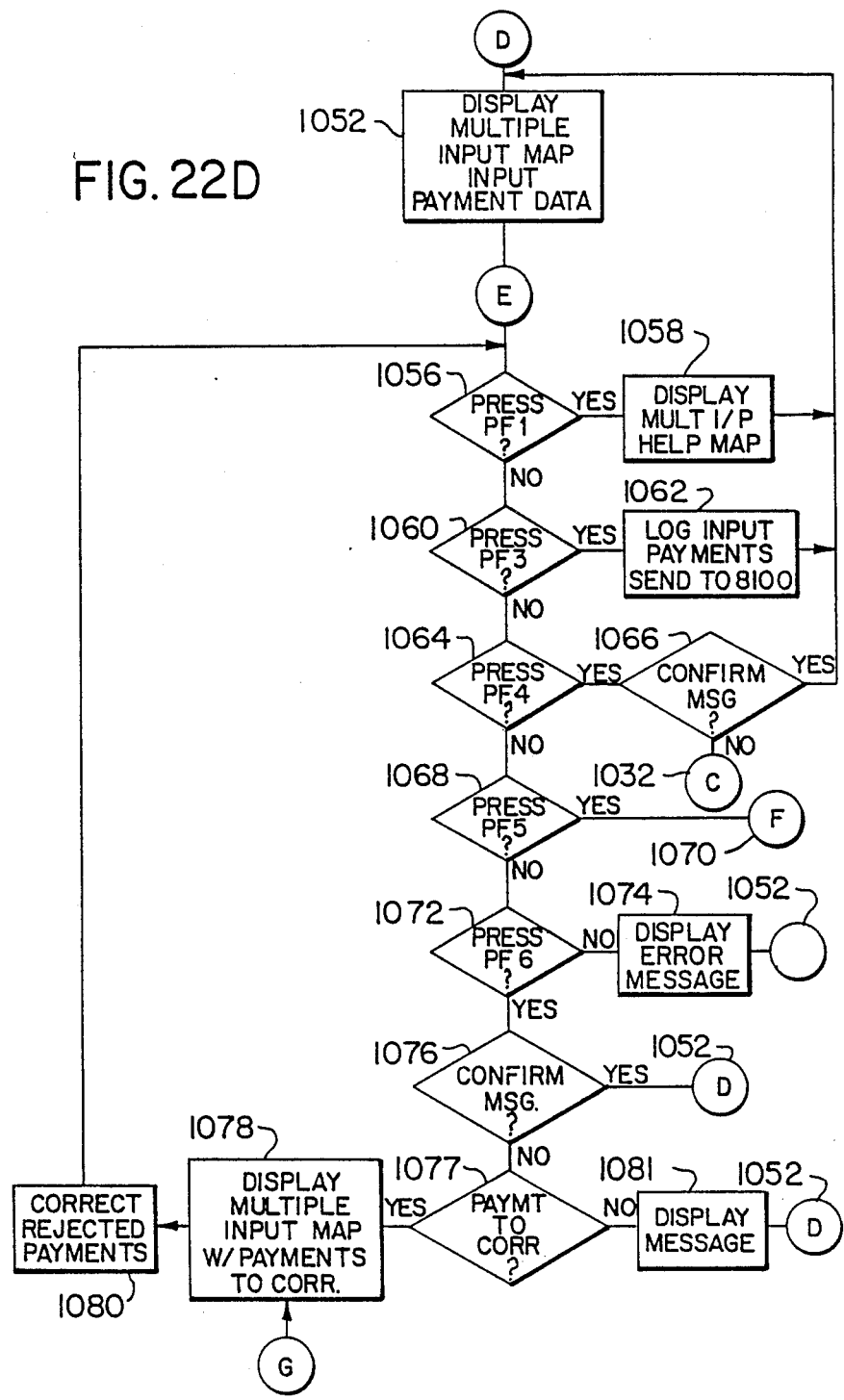

The inquiry at 1030 tests the contents of the data file registers which maintain a running count of the number of accounts entered for processing to ascertain whether the count is zero or non-zero, that is, whether the data files still contain previously entered account data, either unprocessed or processed. THE VDT displays a restart map if the count is non-zero. If the inquiry at 1030 is answered in the affirmative, the VDT screen is caused to display a message such as shown in FIG. 27 prior to displaying the restart map of FIG. 26. The message displayed in FIG. 27 alerts the user that the account data entered during a previous session may not have been completely successfully processed for one of several reasons, and that election of Restart processing to review the status of such previously entered accounts and make corrections to such data, if required, or to add additional account data, if desired, is recommended.

Where a data verification procedure is not needed, the inquiry at 1034 is answered in the affirmative and the program advances to segment "D", as shown in FIG. 22D, where additional new data can be entered. Where data verification is needed or requested, the program advances to 1036, where the operator can review the previously entered data to determine the status of the accounts represented by the data and whether information related thereto was previously successfully or unsuccessfully processed. In the data verification mode (commencing at 1036), the VDT screen displays a message such as shown in FIG. 28, followed by a listing of the accounts which may not have been successfully processed by the mini-computer. After completion of this data verification step, the program advances to segment "D", as is shown in FIG. 22D.

Where the response to the inquiry at 1030 is in the negative, i.e., no RESTART procedure is required, the program advances via inquiry 1032 to segment "C", as shown in FIG. 22C, whereupon the PC Main Menu of the multiple mail option is displayed.

The VDT screen display for the PC Main Menu of the multiple mail option is shown in FIGS. 23A and B. As shown in FIG. 22C, the program checks to insure that the PC Main Menu is displayed at this time, as at 1038. If the response to the inquiry at 1038 is in the negative, the operator is advised to call upon branch support for assistance to correct the problem of failure to display the multiple mail Main Menu. However, if the response to the inquiry at 1038 is in the affirmative, the routine affords the operator a choice of four programmed function (PF) keys from which to choose in order to continue and this choice is displayed on the VDT screen (FIG. 23A). If the operator selects the PF1 key, as at 1040, additional on-screen operator help is provided. If the PF1 key is not depressed, the program ascertains whether the PF2 key has been selected, as at 1041. If the response to this inquiry is in the affirmative, the program loops to 1052 in segment "D", as shown in FIG. 22D. This segment of the program commences processing of the data entered by the operator via a keyboard or optical character reader and writes input data to a storage means, such as a disk, to be sent to the mini-computer for processing when the mini-computer is available for processing payments. If the response to the inquiry at 1041 is in the negative, the program ascertains whether the PF3 key option has been selected as at inquiry 1042. If the response to this inquiry is in the affirmative, the program loops to 1052 in segment "D", as shown in FIG. 22D, where processing of the entered data is commenced. If the response to the inquiry at 1042 is in the negative, the program then ascertains whether the PF4 key option has been selected as at 1044. If the response to inquiry 1044 is in the negative, the system displays an error message at 1046 and loops back to 1032 to display the PC Main Menu. If the response to the inquiry at 1044 is in the affirmative, the program advances to 1048, which calls-up an EXIT routine to the PC. The program then continues to 1050, which requires the operator to follow a standard log-off procedure, including entry of a command such as "LOGOFF" or its equivalent.

If the response to any one of the inquiries at 1034, 1036 (FIG. 22B), 1041 or 1042 (FIG. 22C) is in the affirmative, the program advances to segment "D" in FIG. 22D, commencing at 1052.

At 1052, the program displays a Multiple Input Map requesting input payment data for the multiple mail customer payments, with provision for entry of up to twelve sets of payment information, such as is shown in FIG. 24A. After a full screen of data has been entered (i.e. data relating to up to twelve customer payment transactions), the operator has five options for exiting the payment data input mode, by selecting any one of five PF keys as shown at the bottom of the screen. The program then sequentially determines which, if any, PF key has been depressed and takes the appropriate action represented by the illustrated flow chart.

In an alternative embodiment of the invention, at 1052 in the program sequence, the operator alternatively has the option of inputting the payment data utilizing an optical character reader, instead of manually entering the data via the keyboard. Each loan payment made by a customer generally is accompanied by the return of a payment statement indicating all of the relevant information, including, for example, the customer's name, address, account number, amount of the payment, and the sequential payment number or time period for which the payment is to be applied. This information is pre-printed on the payment statement in a predetermined format according to designated data fields which the micro-computer is programmed to recognize and utilizing a character type face that is easily read by a standard optical character reader (OCR). The customer payment statements which are returned by the customers together with their payments are printed with a special ink which enables the OCR to read a line containing fields which provide information on the account number and the amount of the payment due. When utilizing this option the operator employs a character-scanning device which is passed over the payment statement and converts the information contained in the sensitized fields to digitized data. After scanning a batch of twelve such statements, the digitized information is stored in one of the permanent storage devices of the PC for future processing, or, the batch of data can be transmitted to the mini-computer for immediate processing, utilizing the PF3 key.

The use of OCR's, such as those manufactured by Caere Corporation, to enter payment data significantly reduces the amount of time required for this task. For example, in a large branch office the time required is typically reduced from nine- person-hours (three persons at three hours each) to two person-hours (one person at two hours).

In the program segment shown in FIG. 22D the PF1 key is used as a HELP key which enables the operator to obtain additional on-line information about the various other PF option keys available in this routine. If the response to the inquiry at 1056 whether the PF1 key has been selected is in the affirmative, the program jumps to 1058 where the VDT screen displays a multiple input payments help map, as is shown in FIG. 24B. After displaying this screen, the program then loops back to 1052 upon the operator pressing the ENTER key. If the response to the inquiry at 1056 is in the negative, the program advances to 1060, where inquiry is made as to whether the PF3 key has been depressed.

If the PF2 key was depressed at 1041, while displaying the PC Main Menu, and causing the program to advance to 1052 of segment "D", where data is written to permanent storage, the operator selects the PF3 key at 1060.

The PF3 key instructs the PC to either only log input payment data or to transmit the entered data to the mini-computer for processing, depending upon whether the PF2 or PF3 key had previously been depressed while in the PC Main Menu. If the response to the inquiry at 1060 is in the affirmative, and the PF2 key was depressed while in the PC Main Menu, the PC causes the data to be only written to disk at 1062. If the PF3 key was depressed while in the PC Main Menu, the PC causes the data to be written to disk and transmitted to the IBM 8100 processor at 1062.

If processing resources of the mini-computer are not available when the PC attempts to transmit the data, the program repeats such transmission attempts which, if successful, returns a response to the PC. The absence of a response signifies that a problem may exist at the PC or the mini-computer. In this case, the VDT displays a screen to inform the operator and suggest that branch support services be called for assistance.

After executing 1062, the program loops back to 1052, upon the operator pressing the ENTER key. If the response to the inquiry at 1060 is in the negative, the program advances to 1064 to inquire whether the PF4 key has been depressed. Depression of the PF4 key enables the program to jump to that portion of the program, segment "C", where the PC Main Menu is displayed. The PF4 key is depressed when the screen displays a message that there is previously entered account data which has not been processed still in the system. If the response to the inquiry at 1064 is in the affirmative the program seeks to confirm the response at 1066. This check enables the operator to confirm the last PF key pressed. This confirmation is for accounts that have been displayed for correction or verification only. If the confirmation is in the affirmative, the program loops back to display the Multiple Input Map which allows the input of new data. If the confirmation is in the negative, the program returns control to the PC Main Menu at 1032 in program segment "C".

If the response to inquiry 1064 is in the negative, the program advances to inquiry 1068, where the program ascertains whether the PF5 key has been depressed. The PF5 key is used to terminate the input of payment data. If the response to inquiry 1068 is in the affirmative, the program advances to 1070 in program segment "F", which processes the input payment information at the PC level.

If the response to the inquiry at 1068 is in the negative, the program advances to 1072, to inquire whether the PF6 key has been depressed. The PF6 key enables the operator to view and correct any previously entered payment data which the computer indicates by error messages may not have been correctly entered or were rejected due to subsequent transmission difficulties. If the response to the inquiry at 1072 is in the negative, the program jumps to 1074 where the VDT screen displays the error message relating to the previously input data. The program then loops back to 1052 at the beginning of program segment "D".

If the response to inquiry 1072 is in the affirmative, the program seeks to confirm the response at inquiry 1076. This check enables the operator to confirm the last PF key pressed. This confirmation is for accounts that have been displayed for correction or verification only. If the response to the inquiry at 1076 is in the affirmative, the program loops back to 1052 at the beginning of segment "D". If the response to the inquiry at 1076 is in the negative, the program advances to 1077, at which an inquiry is made to determine if there are payments to correct.

If the response to the inquiry at 1077 is in the affirmative, the program advances to 1078 in program segment "G", which displays the payments to be corrected on the Multiple Payment Map. The program then advances to 1080 which enables such corrections to be made by re-entry or erasure of the data, after which the program loops-back to program segment "E" at 1056.

Figure 22E:
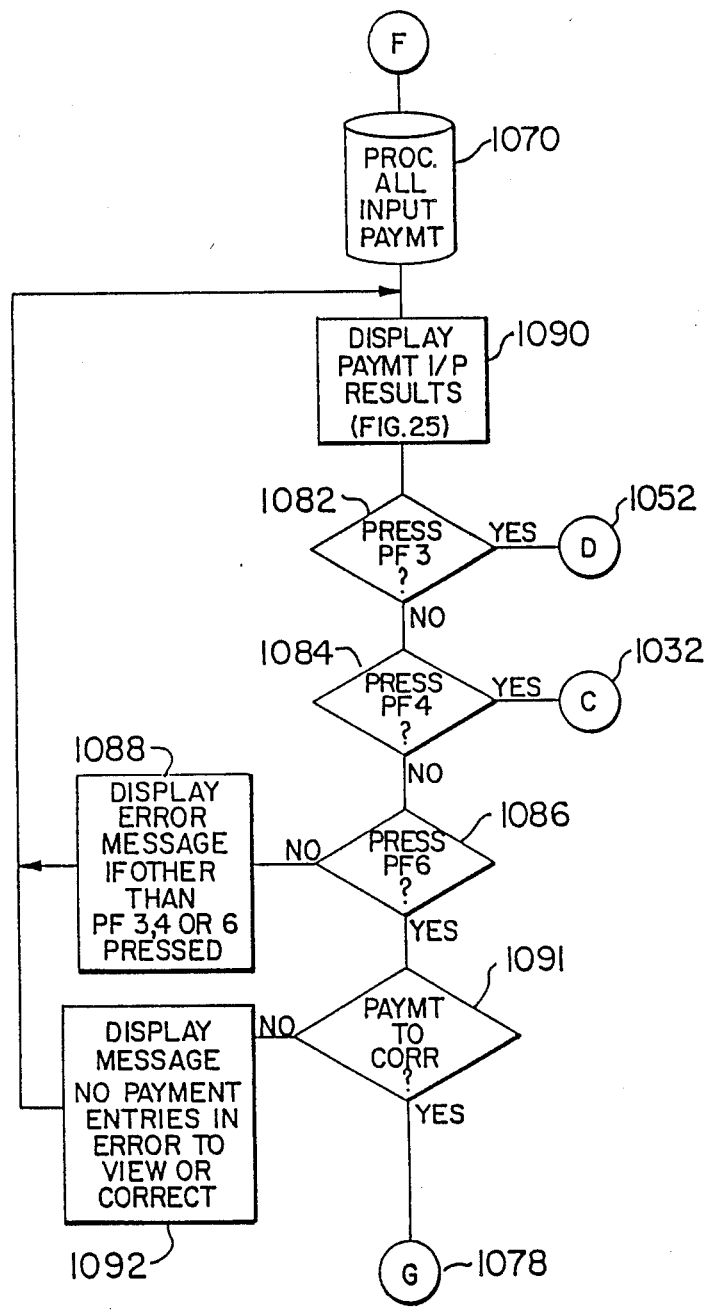

If the response to the inquiry at 1077 is in the negative, there are no payments to be corrected, and the program advances to 1082 at which the VDT screen displays a message that there are no payments to be corrected and then loops-back to the beginning of program segment "D".

Where the response to the inquiry at 1068 is in the affirmative, that is, where there are no more payments to be entered, the program jumps to 1070 in program segment "F", as shown in FIG. 22E. A summary of the results of the data which have been processed is produced at 1070, and this is displayed on the VDT screen at 1090, indicating the total number of payments which were entered, the number of payments which were processed, the number which were rejected and the number which need to be corrected or acknowledged, as is shown in FIG. 25.

The operator then has three PF key options from which to select. The program then sequentially ascertains which of these PF keys has been depressed and takes the appropriate action in response thereto.

The program first inquires whether the PF3 key has been depressed, as at 1082. Pressing the PF3 key instructs the computer that the operator wishes to enter more payment data. If the response to the inquiry at 1082 is in the affirmative, the program loops to 1052 in program segment "D" where the Multiple Input Map is displayed.

If the response to the inquiry at 1082 is in the negative, the program next inquires at 1084 as to whether the PF4 key has been depressed. Pressing the PF4 key instructs the computer to display the main PC menu, as at 1032, by jumping to program segment "C". If the response to the inquiry at 1084 is in the negative, the program advances to 1086, at which inquiry is made whether the PF6 key has been depressed. Pressing the PF6 key permits the operator to view and correct payment data which has previously been entered. If the response to the inquiry at 1086 is in the negative, the program displays an error message at 1088, indicating that a key other than one of the three designated PF keys has been depressed and requests that a valid response be entered, and then automatically loops-back to display on the VDT the payment input results screen, as at 1090. If the response to the inquiry at 1086 is in the affirmative, the program advances to 1091 where it inquires whether there are payment inputs to be corrected. If the response to the inquiry at 1091 is in the negative, the program displays a message at 1092 that there are no payments in error to view or correct and automatically loops-back to display the payment input results screen at 1090, shown in FIG. 25. If the response to the inquiry at 1091 is in the affirmative, the program jumps to 1078 in program segment "G" to display a Multiple Input Map on the VDT screen.

The foregoing has described the sequence of program steps followed to execute the multiple payment input data option for the customer payment financial transaction option utilizing the micro-computer sub-system of the overall financial data processing system. It is, however, not intended that this is to be interpreted as a limitation on the scope of utility and applicability of the micro-computer sub-system. As has been stated above, the micro-computer sub-system can be utilized to enter data pertaining to any of the other financial transaction options of the overall system. Specific micro-computer program routines for the other options will be apparent to those skilled in the art based on the foregoing and in further view of the co-pending parent case.

Other hardware implementations than those discussed above are also encompassed in the scope of the foregoing.

What is claimed is:

1. A financial data processing system comprising:
   central processing means, including a data bank into which data is written and from which data is read, said data including financial credit transaction information representing the balance outstanding for each credit transaction, the finance charge payable for each credit transaction, the amount due and payable for each periodic payment on said credit transaction, the identity of each obligor of said credit transaction, and the delinquency of payment, if any, on each credit transaction;
   a first level of distributed processing means including plural first terminal means coupled to said central processing means selectively operable to write into said data bank updated financial credit transaction information;

a second level of distributed processing means including plural second terminal means coupled to the first level of distributed processing means, each second terminal means being operable by an operator to write to said first level of distributed processing means and thence into the data bank updated financial credit transaction information;

each second terminal means having means for writing during a single operation to said first level of distributed processing means a batch of credit transaction payment data representing payment amounts and the identities of respective obligors for a batch of credit transaction payments;

storage means associated with the first and second levels of distributed processing means, respectively, each of the first and second levels of distributed storage means being operable to store therein the updated financial credit transaction information written from the first or second plural terminal means; and plural display means coupled to the second level of distributed processing means to display data stored in the central data bank and in the storage means associated with the first and second levels of distributed processing means, including credit transaction payment data and credit transaction application data written into the data bank or the respective level of storage means by the operator.

2. The system of claim 1 wherein at least some of the first and second levels of distributed processing means, are located at sites remote from the central processing means; and further including first data communication means for interconnecting the second level of distributed processing means to selected first level of distributed processing means and second data communication means for interconnecting the first level of distributed processing means with the central processing means, to enable data to be transmitted between the first and second levels of distributed processing means, and between the first level of distributed processing means and the central processing means.

3. The system of claim 1, wherein the second level of distributed processing means comprises a plurality of microcomputers.

4. The system of claim 1, wherein the plural terminal means of the second level of distributed processors include a plurality of keyboards for entering data associated with respective terminal means.

5. The system of claim 4, wherein at least one of the terminal means associated with the second level of distributed processing means further includes an optical character reader.

6. The system of claim 1, further including storage disk means associated with at least some of the plural terminal means of the second level of distributed processing means.

7. The system of claim 1, wherein the plural display means coupled to the second level of distributed processing means include video display units.

8. The system of claim 1, wherein at least some of the second level of distributed processing means include access identifying means for identifying predetermined access codes which enable an operator to perform certain financial transaction through the second terminal means and to establish interconnection between the first and second levels of distributed processing means.

9. The system of claim 8, wherein the second level of distributed processing means is programmed to detect erroneous operation of the terminal means included therein and to cause the display means coupled thereto to display an error message thereby permitting an operator to take corrective measures.

10. The system of claim 9, wherein at least one of the terminal means included in the second level of distributed processing means includes an optical character reader to supply data, said data being stored in one of the storage devices associated with the second level of distributed processing means for subsequent transmission to the first level of distributed processing means in batch mode.

11. The system of claim 10, wherein the terminal means included in the second level of distributed processing means are programmed to transmit sets of multiple payment data to the first level of distributed processing means in batch mode, when a communication link is established between said terminal means and the first level of distributed processing means, said terminal means being programmed to continually attempt to transmit the multiple payment data to the first level of distributed processing means if said first level of distributed processing means is not in a data-receiving mode, until such mode is attained.

12. The system of claim 9, wherein the display means associated with a terminal means of the second level of distributed processing means is programmed to display operator help instructions for each type of financial transaction that can be performed by the activation of programmed function keys designated on a menu screen displayed on the second display means.

13. The system of claim 12, wherein the terminal means included in the second level of distributed processing means are operable during data-input sessions and are programmed to display a summary of the data which has been entered during a data-input session, said summary indicating the number of data sets which have been entered, the number of data sets which cannot be further processed at the first level of distributed processing means due to incorrect entry and the number of data sets to be verified and acknowledged prior to being processed by the first level of distributed processing means due to errors during batch-mode data transmission from the second level of distributed processing means to the first level of distributed processing means.

14. The system of claim 1, further including means at a terminal associated with the second level of distributed processing means to initiate a "multiple mail payment" financial transaction to cause the second display means associated therewith to display a format by which data for plural payments are entered for subsequent transmittal to a selected one of the first level of distributed processing means in batch mode for updating of the permanent data base associated with the central processing means; and data input means at said terminal for entering said data for plural payments.

15. The system of claim 14, wherein said displayed format enables a predetermined maximum number of sets of multiple payment data to be entered into said terminal associated with the second level of distributed processing means for subsequent transmittal at one time in batch mode to one of the first level of distributed processing means.

16. The system of claim 1, wherein the terminal means associated with the second level of distributed processing means are micro-computers.

17. The system of claim 1 wherein the terminal means included in the second level of distributed processing means includes means for transmitting financial credit transaction information to said first level of distributed processing means, means for detecting the incomplete receipt of financial credit transaction information by said first level of distributed processing means to cause previously written financial credit transaction information to be displayed by said display means for review and correction by said operator; and means for completing the transmission of financial credit transaction information to said first level of distributed processing means.

18. The system of claim 1 wherein the terminal means included in the second level of distributed processing means includes means actuable by an operator to correct financial credit transaction information displayed by said display means and identified as not being received by said first level of distributed processing means from said terminal.

19. A method of processing financial data comprising the steps of:

storing in a central data bank, into which data is written and from which data is read, financial credit transaction data representing the balance for each credit transaction outstanding, the finance charge payable for each credit transaction, the amount due and payable for each periodic payment on said credit transaction, the identity of each obligor of said credit transaction, and the delinquency of payment, if any, on each credit transaction;

operating individual ones of plural first terminal means, associated with a first level of distributed processing means which are coupled to the central data bank and to a second level of distributed processing means, to write into and read from the central data bank and to receive batches of input data from the second level of distributed processing means for further processing and entry into the central data bank, updated financial credit transaction data;

writing from said second level of distributed processing means to said first level, during a single operation a batch of credit payment data representing payment amounts and the identities of respective obligors for a batch of credit transaction payments;

writing from said second level of distributed processing means to said first level credit transaction application data representing the identity of each applicant, the amount, type and duration of the requested credit transaction, the finance charge payable on the requested credit transaction and data representing the applicant's ability to repay the requested credit transaction;

subsequently transmitting the credit payment data and application data from the first level of distributed processing means to the central data bank for updating of the central data bank; and displaying data written to and read from the central data bank and read from the second level of distributed processing means on first display means associated with the first level of distributed processing means and displaying data written to and read from the data bank through the first level of distributed processing means. and written to storage means associated with the second level of distributed processing means on second display means associated with the second level of distributed processing means, said data including payment data and credit transaction application data, summary data representing summaries of plural credit transactions outstanding, payment delinquencies of said plural credit transactions outstanding, collection histories, loss of amounts resulting from credit transactions which are not repaid, and summaries of batches of input data entered from the second level of distributed processing means.

20. The method of claim 19, wherein batches of updated credit transaction data are entered into the system utilizing an optical character reader associated with a terminal means of the second level of distributed processing means.

* * * * *